United States Patent
Lee et al.

(10) Patent No.: US 10,777,115 B2
(45) Date of Patent: Sep. 15, 2020

(54) DISPLAY DEVICE AND METHOD OF DRIVING THE SAME

(71) Applicant: SAMSUNG DISPLAY CO., LTD., Yongin-si, Gyeonggi-do (KR)

(72) Inventors: Dong Hoon Lee, Yongin-si (KR); Jin Woo Noh, Yongin-si (KR); Byung Sun Kim, Yongin-si (KR); Jae Hyung Cho, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 79 days.

(21) Appl. No.: 15/883,502

(22) Filed: Jan. 30, 2018

(65) Prior Publication Data

US 2018/0342192 A1 Nov. 29, 2018

(30) Foreign Application Priority Data

May 26, 2017 (KR) .................. 10-2017-0065434

(51) Int. Cl.
*G09G 3/20* (2006.01)
*G09G 5/02* (2006.01)
*G06F 1/16* (2006.01)

(52) U.S. Cl.
CPC ......... *G09G 3/2007* (2013.01); *G06F 1/1652* (2013.01); *G09G 3/2092* (2013.01); *G09G 5/02* (2013.01); *G09G 2300/0857* (2013.01); *G09G 2310/027* (2013.01); *G09G 2310/0267* (2013.01); *G09G 2310/08* (2013.01);
(Continued)

(58) Field of Classification Search
CPC ...... G09G 3/2007; G09G 3/2092; G09G 5/02; G09G 2340/0428; G09G 2320/0271; G09G 2320/0686; G09G 2320/046; G09G 2320/0257; G09G 2320/0233; G09G 2320/0238; G09G 2370/08; G09G 2310/027; G09G 2310/0267;
(Continued)

(56) References Cited

U.S. PATENT DOCUMENTS

2013/0215041 A1* 8/2013 Kim ................. G06F 3/0487
345/173
2014/0009449 A1* 1/2014 Jang .................. G09G 3/20
345/204
(Continued)

FOREIGN PATENT DOCUMENTS

| KR | 1020150109992 A | 10/2015 |
| KR | 1020160029222 A | 3/2016 |
| KR | 1020160130027 A | 11/2016 |

*Primary Examiner* — Brent D Castiaux
(74) *Attorney, Agent, or Firm* — Cantor Colburn LLP

(57) ABSTRACT

A display device includes a display panel which includes first and second display areas adjacent to each other, a processor which generates first image data corresponding to the first and second display areas if a display mode is a first mode, and generates second image data corresponding to the first display area if the display mode is a second mode and a display driver which generates a first data signal corresponding to the first image data in the first mode, and converts the second image data and generates a second data signal corresponding to the converted second image data in the second mode. When the display device is driven in the second mode, a gradation image may be displayed on at least a region of the second display area.

19 Claims, 17 Drawing Sheets

(52) U.S. Cl.
CPC ........... *G09G 2320/0233* (2013.01); *G09G 2320/0238* (2013.01); *G09G 2320/0257* (2013.01); *G09G 2320/0271* (2013.01); *G09G 2320/046* (2013.01); *G09G 2320/0686* (2013.01); *G09G 2340/0428* (2013.01); *G09G 2370/08* (2013.01); *G09G 2380/02* (2013.01)

(58) Field of Classification Search
CPC .......... G09G 2310/08; G09G 2380/02; G09G 2300/0857; G06F 1/1652
See application file for complete search history.

(56) References Cited

U.S. PATENT DOCUMENTS

| | | | |
|---|---|---|---|
| 2015/0253884 A1* | 9/2015 | Hwang | G06F 1/1652 345/173 |
| 2015/0255016 A1* | 9/2015 | An | G09G 3/3233 345/211 |
| 2016/0071457 A1 | 3/2016 | Kim et al. | |
| 2016/0321974 A1 | 11/2016 | Chun et al. | |

\* cited by examiner

DISPLAY DEVICE AND METHOD OF DRIVING THE SAME

This application claims priority to Korean patent application no. 10-2017-0065434, filed on May 26, 2017, and all the benefits accruing therefrom under 35 U.S.C. § 119, the content of which in its entirety is herein incorporated by reference.

BACKGROUND

1) Field of Invention

Exemplary embodiments of the invention relate to a display device and a method of driving the display device.

2) Description of Related Art

A display device such as a foldable display device or a rollable display device having a display panel, at least a portion of which is deformable, are being developed. Accordingly, there is a surge in demand for a display device which is able to support both an entire display mode in which a valid image is displayed on the entirety of a display area and a partial display mode in which a valid image is displayed only on a partial region of the display area. Such a display device capable of supporting a plurality of display modes may enhance ease of use because it can be efficiently driven in accordance with the use environment, the state, etc. thereof.

SUMMARY

Various embodiments of the invention provide a display device capable of supporting a partial display mode and mitigating an image sticking phenomenon, and a method of driving the display device.

According to an exemplary embodiment of the invention, a display device includes a display panel which includes first and second display areas adjacent to each other, a processor which generates first image data corresponding to the first and second display areas if a display mode is a first mode, and generates second image data corresponding to the first display area if the display mode is a second mode, and a display driver which generates a first data signal corresponding to the first image data in the first mode, and converts the second image data and generates a second data signal corresponding to the converted second image data in the second mode. When the display device is driven in the second mode, a gradation image may be displayed on at least a region of the second display area.

In an exemplary embodiment, the gradation image may be displayed on the region, adjacent to the first display area, of the second display area, and a luminance of the gradation image may be gradually reduced in a direction away from the first display area.

In an exemplary embodiment, the gradation image may be an image formed by gradually changing a luminance of at least one pixel line, adjacent to the second display area, among pixel lines provided in the first display area.

In an exemplary embodiment, the display driver may include an image converter which receives the second image data from the processor in the second mode, and the image converter may convert the second image data such that the gradation image is displayed in the second mode.

In an exemplary embodiment, the image converter may generate, in the second mode, gradation data corresponding to at least the region of the second display area using a gradation value of at least one pixel line adjacent to the second display area among pixel lines in the first display area.

In an exemplary embodiment, the image converter may generate the gradation data by subtracting values that increase successively in a direction away from the first display area from the gradation value of the at least one pixel line of the first display area.

In an exemplary embodiment, the image converter may generate the gradation data by applying rate values that are successively reduced in direction away from the first display area to the gradation value of the last pixel line of the first display area.

In an exemplary embodiment, the image converter may generate the gradation data until the gradation data has a gradation value of a predetermined minimum gradation or less.

In an exemplary embodiment, the display driver may include a timing controller which comprises the image converter and generates a data control signal and a scan control signal in response to a control signal provided from the processor, a data driver which generates the first or second data signal in response to the first image data or the converted second image data and the data control signal and a scan driver which generates a scan signal in response to the scan control signal.

In an exemplary embodiment, the first and second display areas may be successively disposed.

In an exemplary embodiment, the display panel may be a foldable display panel foldable on a predetermined folding axis.

In an exemplary embodiment, the display panel may be folded outward on the folding axis.

In an exemplary embodiment, the display device may further include a sensor which senses deformation of the display panel and output a sensing signal.

In an exemplary embodiment, the processor may be driven in the first or second mode in response to the sensing signal and outputs a selection signal corresponding to the first or second mode.

In an exemplary embodiment, the display driver may operate in the first or second mode in response to the selection signal.

According to an exemplary embodiment of the invention, a method of driving a display device includes selecting one of first and second modes, generating first image data in the first mode and second image data in the second mode, displaying a valid image on first and second display areas in response to the first image data, or displaying the valid image only on the first display area in response to the second image data, and converting the second image data such that a gradation image is displayed on at least a region of the second display area when the display device is driven in the second mode.

In an exemplary embodiment, converting the second image data may include generating gradation data corresponding to at least some of pixel lines, adjacent to the first display area, of the second display area, using a gradation value of at least one pixel line, adjacent to the second display area among pixel lines in the first display area.

In an exemplary embodiment, the method may further include sensing deformation of a display panel including the first and second display areas, and outputting a sensing signal. One of the first and second modes may be selected in response to the sensing signal.

In an exemplary embodiment, the second mode may be selected when the deformation of the display panel is sensed.

In an exemplary embodiment, when the display device is driven in the second mode, the valid image may be displayed on the first display area, the gradation image may be displayed on a region, adjacent to the first display area, of the second display area, and pixels of a remaining region of the second display area may be turned off.

DETAILED DESCRIPTION

Figure 1A:
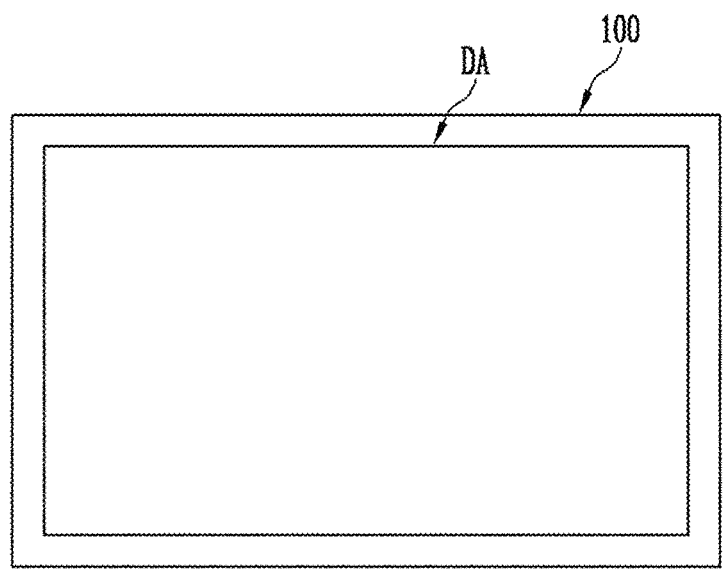
FIGS. 1A and 1B illustrate an exemplary embodiment of a display panel in accordance with the invention.

Example embodiments will now be described more fully hereinafter with reference to the accompanying drawings; however, they may be embodied in different forms and should not be construed as limited to the embodiments set forth herein. Rather, these exemplary embodiments are provided so that this disclosure will be thorough and complete, and will fully convey the scope of the exemplary embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout. Furthermore, in description of each exemplary embodiment, detailed descriptions equal or similar to those of preceding exemplary embodiments will be omitted. It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1B:
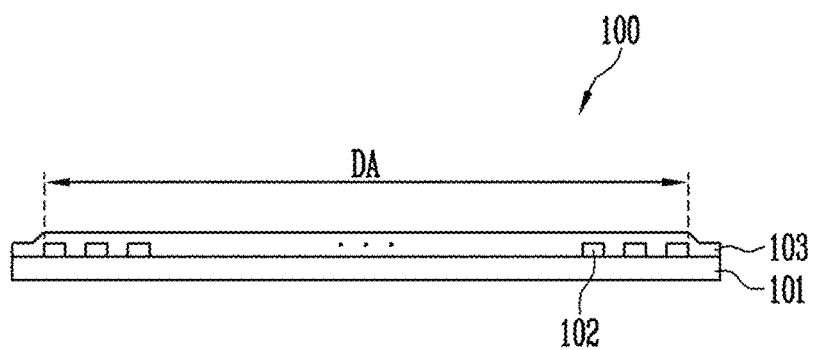

FIGS. 1A and 1B illustrate an exemplary embodiment of a display panel 100 in accordance with the invention.

Referring to FIGS. 1A and 1B, the display panel 100 may include a display area DA. The display area DA may receive a data signal corresponding to image data and display an image corresponding to the data signal.

In an exemplary embodiment, the display panel 100 may be a flexible display panel. For example, at least a portion of the display panel 100 may be embodied to be flexible such that it is bendable, foldable and/or rollable.

In an exemplary embodiment, the display panel 100 may be a flexible organic light-emitting display panel which includes a flexible substrate 101, a plurality of pixels 102 disposed on the flexible substrate 101, a flexible thin film encapsulation layer 103 configured to encapsulate the pixels 102. However, the kind and/or the shape of the display panel 100 in accordance with the invention are not limited to those of the above exemplary embodiments.

In an exemplary embodiment, the substrate 101 may be embodied by a thin film or the like made of flexible material. The substrate 101 may include at least one material of polyethersulfone ("PES"), polyacrylate, polyetherimide ("PEI"), polyethylene naphthalate ("PEN"), polyethylene terephthalate ("PET"), polyphenylene sulfide ("PPS"), polyarylate ("PAR"), polyimide ("PI"), polycarbonate ("PC"), triacetate cellulose ("TAC"), and cellulose acetate propionate ("CAP"). The material included in the substrate 101 is not limited to the above-mentioned materials. In addition to the above-mentioned materials, other materials having flexibility of a predetermined range may be used to provide the substrate 101.

In an exemplary embodiment, each of the pixels 102 may be a pixel for an organic light-emitting display panel, and each of the pixels 102 may include an organic light-emitting diode. However, the kind of pixels 102 according to the invention is not limited thereto.

In an exemplary embodiment, the thin film encapsulation layer 103 may be an encapsulation layer having a multilayer structure with at least one organic layer or inorganic layer. For example, the thin film encapsulation layer 103 may include first and second inorganic layers which overlap each other, and at least one organic layer interposed between the first and second inorganic layers. In an exemplary embodiment, the thin film encapsulation layer 103 may be an encapsulation layer having a single-layer structure including a combination of organic and inorganic materials.

In an exemplary embodiment, the display panel 100 may display a valid image on the entirety of the display area DA in a state that the display panel 100 is unfolded, e.g., in a flat state. On the other hand, the display panel 100 may display a valid image only on a partial region of the display area DA, e.g., a partial region exposed to a user, when the display panel 100 is in a deformed state, e.g., a bent, folded, and/or rolled state.

Figure 2A:
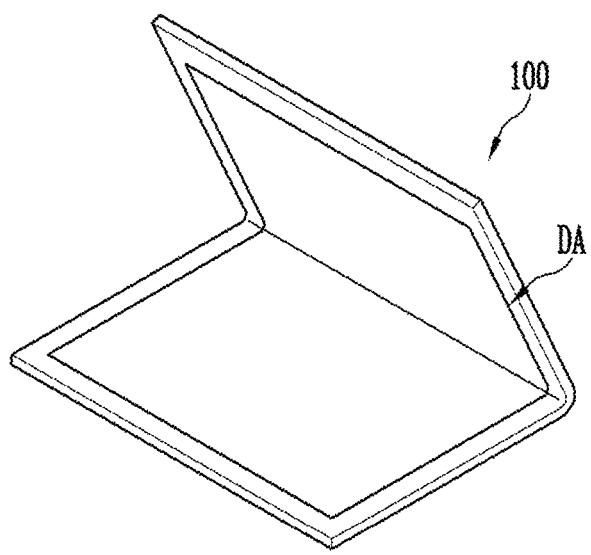
FIGS. 2A and 2B illustrate an exemplary embodiment of a display panel in accordance with the invention.
Figure 2B:
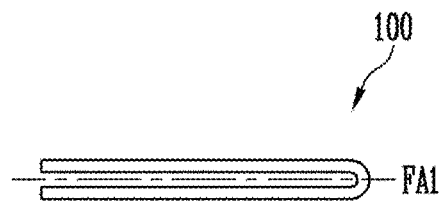

FIGS. 2A and 2B illustrate an exemplary embodiment of a display panel 100 in accordance with the invention.

Referring to FIGS. 2A and 2B, the display panel 100 may be a foldable display panel. In an exemplary embodiment, the display panel 100 may be an inwardly foldable display panel which is foldable on a first folding axis FA1 such that the display area DA faces inward in a folded state. In another exemplary embodiment, the display panel 100 may be embodied such that both inward fold and outward fold are possible. The outward fold means that the display panel is foldable such that the display area DA faces outward in a folded state.

Figure 3A:
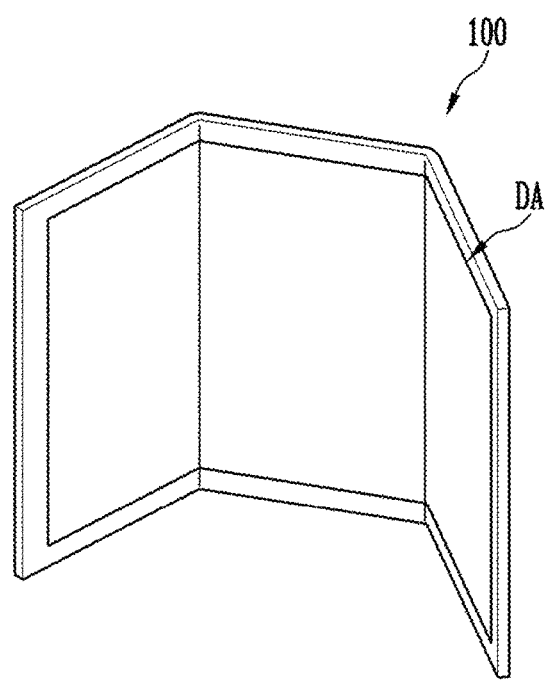
FIGS. 3A and 3B illustrate another exemplary embodiment of a display panel in accordance with the invention.
Figure 3B:

FIGS. 3A and 3B illustrate another exemplary embodiment of a display panel 100 in accordance with the invention.

Referring to FIGS. 3A and 3B, the display panel 100 may be a foldable display panel that is foldable on a plurality of regions. In an exemplary embodiment, for example, the display panel 100 may be an inwardly foldable display panel that may be folded inward on two predetermined regions. The folding areas and/or direction of the display panel 100 in accordance with the invention are not limited to the above exemplary embodiments. In another exemplary embodiment, for example, the overall area of the display panel 100 may have flexibility, and any region of the display panel 100 may be folded inward and/or folded outward.

Figure 4A:
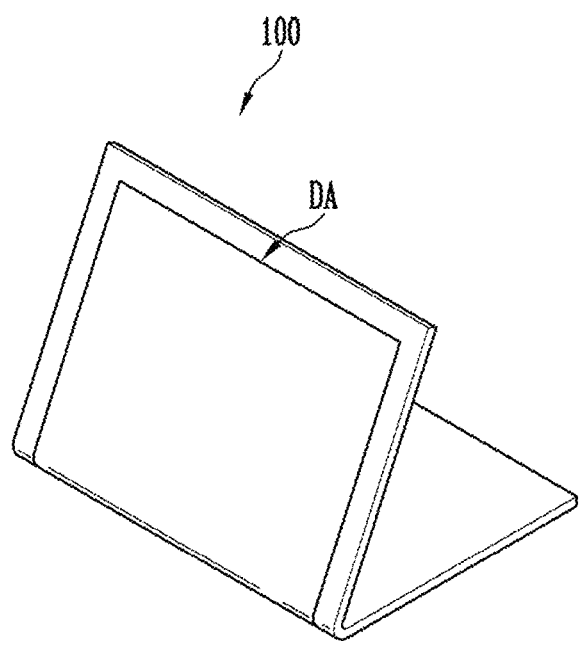
FIGS. 4A and 4B illustrate still another exemplary embodiment of a display panel in accordance with the invention.
Figure 4B:
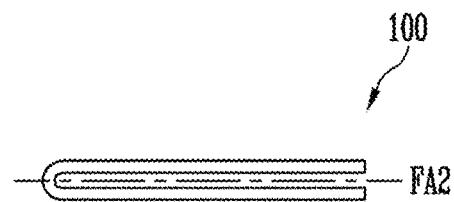

FIGS. 4A and 4B illustrate still another exemplary embodiment of a display panel 100 in accordance with the invention.

Referring to FIGS. 4A and 4B, the display panel 100 may be an outwardly foldable display panel which may be folded outward. In an exemplary embodiment, for example, the display panel 100 may be folded outward on a second folding axis FA2 such that the display area DA faces outward in the folded state. In another exemplary embodiment, the display panel 100 may be embodied such that both inward fold and outward fold are possible. In this case, the first folding axis FA1 for inward fold and the second folding axis FA2 for outward fold may be the same single axis or different axes.

Figure 5A:
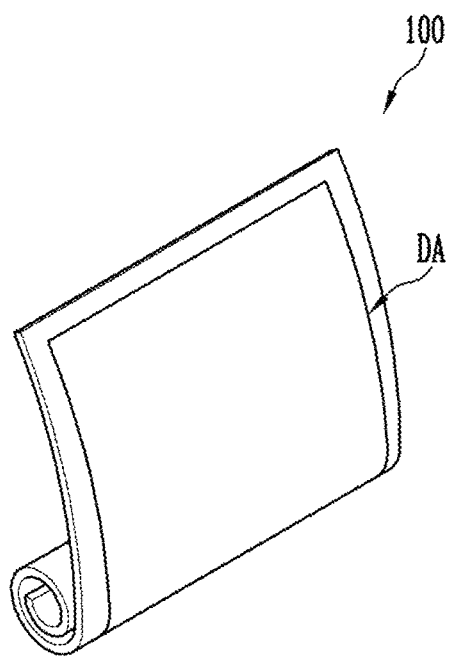
FIGS. 5A and 5B illustrate still another exemplary embodiment of a display panel in accordance with the invention.
Figure 5B:
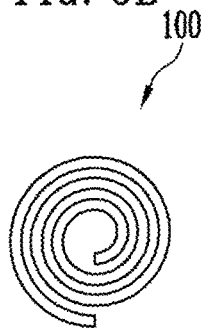

FIGS. 5A and 5B illustrate still another exemplary embodiment of a display panel 100 in accordance with the invention.

Referring to FIGS. 5A and 5B, the display panel 100 may be a rollable display panel. In an exemplary embodiment, for example, the display panel 100 may be rollable such that the display area DA faces outward or inward in a rolled state. In another exemplary embodiment, a portion of the display panel 100 may be rolled, and the rolling direction thereof is not limited to a certain direction.

Figure 6A:
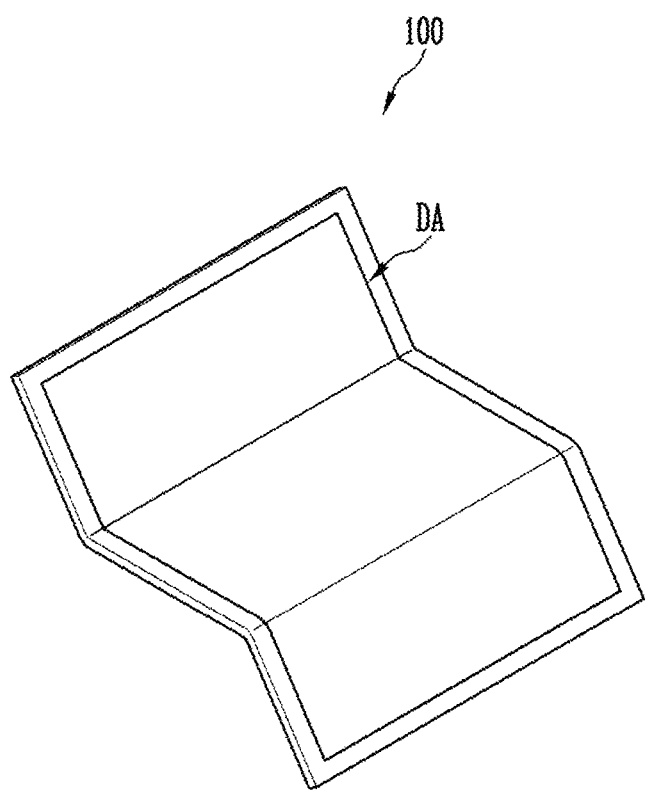
FIGS. 6A and 6B illustrate still another exemplary embodiment of a display panel in accordance with the invention.
Figure 6B:

FIGS. 6A and 6B illustrate still another exemplary embodiment of a display panel 100 in accordance with the invention.

Referring to FIGS. 6A and 6B, the display panel 100 may be a foldable display panel which is inwardly foldable in some regions and outwardly foldable in some other regions. In an exemplary embodiment, for example, a portion of the display panel 100 may be inwardly foldable on a first folding axis FA1, and another portion of the display panel 100 may be outwardly foldable on a second folding axis FA2.

Figure 7A:
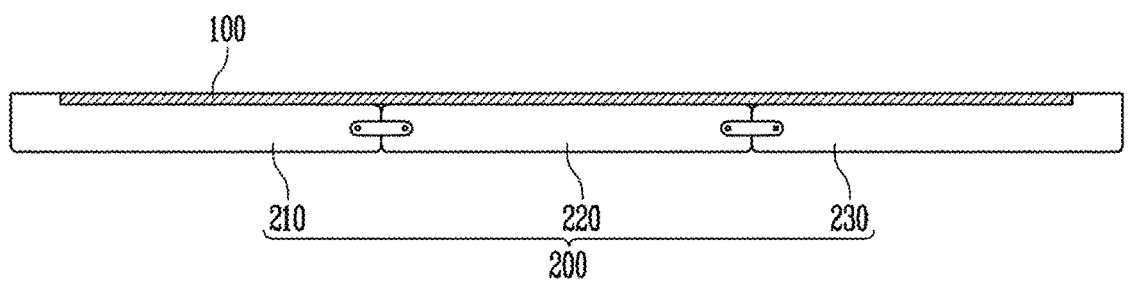
FIGS. 7A and 7B illustrate an exemplary embodiment of a display device in accordance with the invention.
Figure 7B:
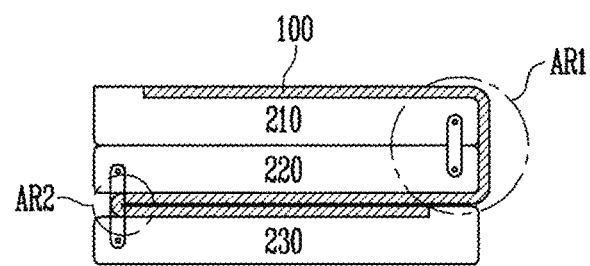

FIGS. 7A and 7B illustrate an exemplary embodiment of a display device in accordance with the invention. In FIGS. 7A and 7B, a display device including the display panel 100 of FIGS. 6A and 6B is illustrated, but the invention is not limited thereto.

Referring to FIGS. 7A and 7B, the display device may include the display panel 100, and a casing 200 coupled to the display panel 100. In an exemplary embodiment, the display panel 100 may be a flexible display panel.

In an exemplary embodiment, the casing 200 may include first, second, and third casings 210, 220, and 230. The first casing 210 and the second casing 220 may be rotatably coupled to each other, and the second casing 220 and the third casing 230 may be rotatably coupled to each other. Depending on the rotation of the first, second, and third casings 210, 220, and 230, the display panel 100 may be unfolded, as shown in FIG. 7A, or may be folded to have an outward folding area AR1 and an inward folding area AR2, as shown in FIG. 7B. In an exemplary embodiment, for example, the display panel 100 may be folded outward with respect to a combination of the first and second casings 210 and 220 and folded inward with respect to a combination of the second and third casings 220 and 230. In this case, a region of the display panel 100 that is supported by the first casing 210 and a front surface of the first and second casings 210 and 220 in the outward folding area AR1 (e.g., a surface on which the display area DA of FIG. 1 is disposed) are exposed to the outside, and the other region of the display panel 100 that includes the inward folding area AR2 is covered with the second and third casings 220 and 230.

In an exemplary embodiment, when in an unfolded state, the display panel 100 may display a valid image on the entirety of the display area DA. When in a folded state, the display panel 100 may display a valid image only on a region of the display area DA. For instance, as shown in FIG. 7B, when the display panel 100 is folded, the display panel 100 may display a valid image only on the outward folding area AR1 and the region thereof that is supported by the first casing 210. The other region of the display panel 100 may be turned off or may display an invalid image (e.g., a black or gradation image).

As such, the display device in accordance with an exemplary embodiment of the invention may display a valid image on different regions, e.g., regions having different ranges, depending on folding conditions and so forth. Here, if the display device is used in the folded state for a long time, a deterioration deviation may occur between pixels disposed in the region of the display area DA that has displayed the valid image and pixels disposed in the other region. In an exemplary embodiment, for example, in the case where the display panel 100 is an organic light-emitting display panel, a deterioration deviation may occur between organic light-emitting diodes included in pixels disposed in a region of the display panel 100 that has continuously displayed a valid image in the folded state and organic light-emitting diodes included in pixels disposed in the other region. Consequently, when the display device is used in the unfolded state, the pixels may show different luminance characteristics depending on the regions of the display area DA where the pixels are included, whereby an image sticking phenomenon may be caused in a boundary area between the regions. Thereby, the image quality of the display device may be reduced. The invention provides a display device and a method of driving the display device, which may support a plurality of display modes including an entire display mode and a partial display mode to enhance ease of use, and which may reduce or mitigate the image sticking phenomenon on a display area.

Figure 8:
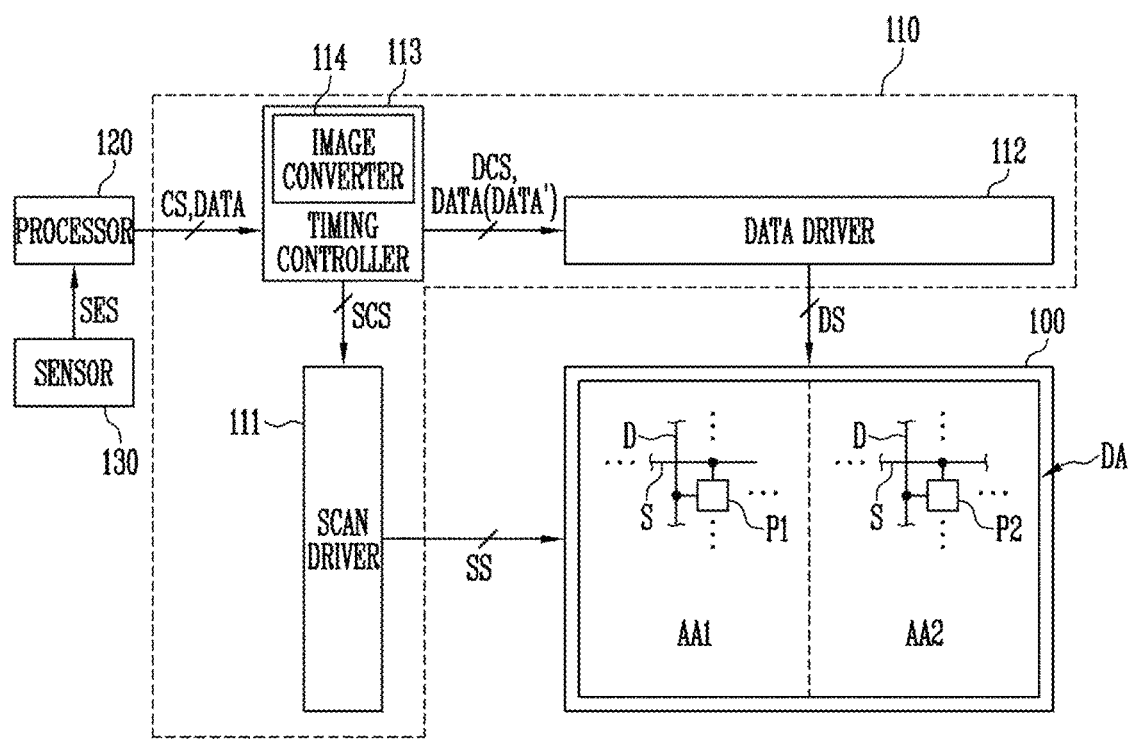
FIGS. 8 and 9 are block diagrams illustrating exemplary configuration of a display device in accordance with the invention.
Figure 9:
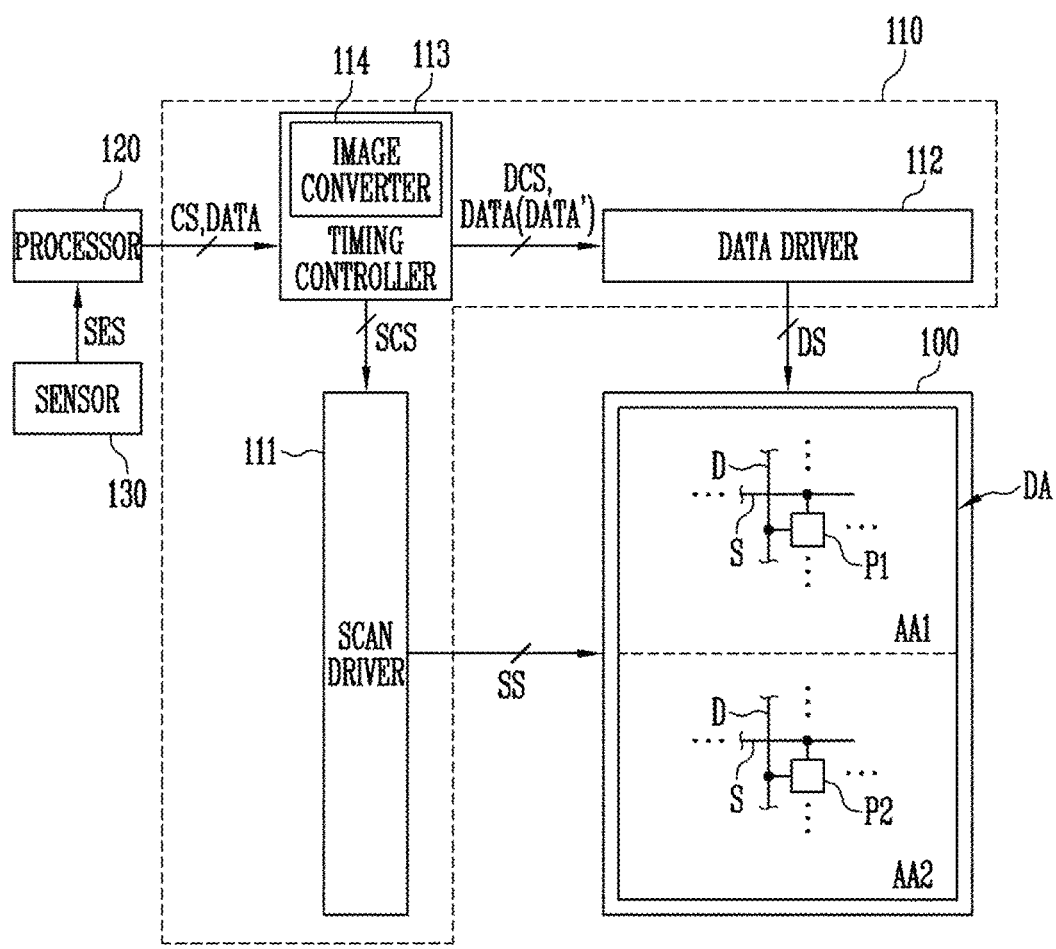

FIGS. 8 and 9 are block diagrams illustrating exemplary configuration of a display device in accordance with the invention. FIG. 9 illustrates a modification of the exemplary embodiment of FIG. 8.

Referring to FIGS. 8 and 9, the display device in accordance with an exemplary embodiment of the invention may include a display panel 100, a display driver 110, and a processor 120. In an exemplary embodiment, the display device may further include a sensor 130 configured to sense the use environment, the state, etc. thereof.

The display panel 100 may be a flexible display panel that has been described in the preceding exemplary embodiments. In other words, the display panel 100 may be configured to be bendable, foldable, and/or rollable.

In an exemplary embodiment, for example, the display panel 100 may be a foldable display panel that may be folded on a predetermined folding axis. For instance, the display panel 100 may be folded outward on the second folding axis FA2, as described with reference to FIGS. 4A, 4B, 6A, and 6B.

The display device including the display panel 100 may display a valid image on different regions (e.g., regions having different sizes, positions and/or ranges) of the overall display area DA depending on the use environment, the conditions, and/or the state of the display device. In an exemplary embodiment, for example, the display device's mode may be converted into the partial display mode in the outwardly folded state. While the partial display mode is performed, only a partial region of the overall display area DA that is exposed to the user may be used to display a desired valid image.

In an exemplary embodiment, the display area DA may have a horizontally elongated shape, as shown in FIG. 8, or may have a vertically elongated shape, as shown in FIG. 9. However, the present invention is not limited to these examples. In other words, the shape, the orientation, or the like of the display area DA in accordance with the present invention is not limited to the above exemplary embodiments. In an exemplary embodiment, the display area DA may have a horizontally or vertically elongated shape depending on the use orientation of the display device. Depending on the use orientation, an image displayed on the display area DA may be rotated. In other words, depending on exemplary embodiments, the display area DA may be orientated in a landscape form or a portrait form when it is driven.

In an exemplary embodiment of the present invention, the display area DA may be divided into a plurality of areas. For example, the display area DA may include sub-areas (e.g., first and second display areas AA1 and AA2). The number of sub-areas of the display area DA in accordance with the present invention may not be limited thereto.

The first and second display areas AA1 and AA2 may be disposed adjacent to each other. In an exemplary embodiment, for example, the first and second display areas AA1 and AA2 may be disposed adjacent to each other in a horizontal direction, as shown in FIG. 8, or may be disposed adjacent to each other in a vertical direction, as shown in FIG. 9. In an exemplary embodiment, the first and second display areas AA1 and AA2 may be successively disposed, but the present invention is not limited thereto.

In an exemplary embodiment, at least one kind of lines of scan lines S and data lines D disposed on the first and second display areas AA1 and AA2 may be continuously disposed through the first and second display areas AA1 and AA2 without being disconnected. For example, in an exemplary embodiment of FIG. 8, each scan line S may be continuously disposed through the first and second display areas AA1 and AA2. Alternatively, in an exemplary embodiment of FIG. 9, each data line D may be continuously disposed through the first and second display areas AA1 and AA2. However, the present invention is not limited thereto. For instance, in an exemplary embodiment of the present invention, the scan lines S and/or the data lines D may be discontinuously disposed between the first and second display areas AA1 and AA2.

The first and second display areas AA1 and AA2 may include a plurality of first pixels P1 and a plurality of second pixels P2, respectively. In an exemplary embodiment, for example, the first display area AA1 may include a plurality of scan lines S, a plurality of data lines D, and a plurality of first pixels P1 coupled to the scan lines S and the data lines D. The second display area AA2 may include a plurality of scan lines S, a plurality of data lines D, and a plurality of second pixels P2 coupled to the scan lines S and the data lines D.

Each of the first and second pixels P1 and P2 may be selected when a scan signal SS having a gate-on voltage is supplied thereto from the corresponding scan line S, and thus be supplied with a data signal DS from the corresponding data line D. In an exemplary embodiment, for each frame period, each of the first and second pixels P1 and P2 may be supplied with a data signal DS of a corresponding frame and emit light at a luminance corresponding to the data signal DS. As a result, a desired image corresponding to the data signal DS may be displayed on the display area DA.

The display driver 110 may include a scan driver 111, a data driver 112, and a timing controller 113. The display driver 110 may further include an image converter 114. In an exemplary embodiment, the image converter 114 may be configured in the timing controller 113, but the invention is not limited thereto.

In an exemplary embodiment, the scan driver 111, the data driver 112, and the timing controller 113 may be integrated with each other. For example, the display driver 110 may be embodied by a TCON embedded driver IC ("TED D-IC") provided with the timing controller 113. However, the present invention is not limited thereto. For example, in an exemplary embodiment of the present invention, at least one of the scan driver 111, the data driver 112, and the timing controller 113 may be separated from the other elements.

In an exemplary embodiment, although the display driver 110 and the display panel 100 have been illustrated separately from each other in FIGS. 8 and 9, the present invention is not limited thereto. For example, in an exemplary embodiment, at least one of the scan driver 111, the data driver 112, and the timing controller 113 may be integrated, along with the first and second pixels P1 and P2, in the display panel 100 or mounted on an area of the display panel 100.

The scan driver 111 may receive a scan control signal SCS from the timing controller 113 and generate the scan signal SS in response to the scan control signal SCS. In an exemplary embodiment, the scan control signal SCS may include a gate start pulse and a gate shift clock. In an exemplary embodiment, the scan driver 111 may sequentially generate the scan signals SS by sequentially shifting the gate start pulse using the gate shift clock and supply the scan signals SS to the scan lines S.

The data driver 112 may be supplied with a data control signal DCS and image data DATA from the timing controller 113. In an exemplary embodiment, the data control signal DCS may include a source start pulse, a source shift clock, and a source output enable signal. The data driver 112 may generate a data signal DS corresponding to the image data DATA using the data control signal DCS, and supply the data signal DS to the data lines D. In an exemplary embodiment, for each of a plurality of horizontal periods forming each frame period, the data driver 112 may supply, to the data lines D, a data signal DS corresponding to a horizontal pixel row associated with each horizontal period.

In an exemplary embodiment, a region, e.g., the second display area AA2, of the overall display area DA may be set to an invalid display area depending on the use environment or the state (e.g., whether the display panel 100 is deformed and/or the degree of deformation). For instance, the second display area AA2 may be covered with the casing 200 or the like shown in FIG. 7B and thus may be set to the invalid display area.

When the second display area AA2 is set to the invalid display area, the data driver 112 may supply, to the second display area AA2, a data signal DS corresponding to black gradation and/or a data signal DS corresponding to a gradation image. Alternatively, in an exemplary embodiment, the data driver 112 may not supply a data signal DS to the region (e.g., an off area that is a region other than a gradation image displaying region and displays black gradation) of the second display area AA2 when the second display area AA2 is set to the invalid display area. In this case, the data lines D disposed in the region of the second display area AA2 may be coupled to a predetermined bias power source that controls second pixels P2 in the corresponding region such that the second pixels P2 do not emit light (e.g., turned off).

The timing controller 113 may be supplied with a control signal CS and the image data DATA from the processor 120. In an exemplary embodiment, the control signal CS may include a horizontal synchronization signal and a vertical synchronization signal. In an exemplary embodiment, the control signal CS may further include a selection signal or the like for selecting the display mode.

The timing controller 113 may drive the scan driver 111 and the data driver 112 in response to the control signal CS and the image data DATA. In an exemplary embodiment, for example, the timing controller 113 may generate a scan control signal SCS and a data control signal DCS in response to the control signal CS, supply the scan control signal SCS to the scan driver 111, and supply the data control signal DCS to the data driver 112. The timing controller 113 may rearrange the image data DATA and supply the rearranged image data to the data driver 112. This will be described later in detail.

When the display device in accordance with an exemplary embodiment of the invention is driven in a partial display mode in which a valid image is displayed on a partial region, e.g., the first display area AA1, of the display area DA, the timing controller 113 may convert the image data DATA supplied from the processor 120 and supply converted image data DATA' to the data driver 112. In this case, the data driver 112 may generate a data signal DS corresponding to the converted image data DATA', so that the display panel 100 may display an image corresponding to the converted image data DATA'.

For example, in an exemplary embodiment of the invention, the timing controller 113 may convert the image data DATA such that a gradation image is displayed on at least a partial region of an area (e.g., the second display area AA2) of the overall display area DA other than a valid display area (e.g., the first display area AA1) set to display a valid image. For instance, the timing controller 113 may convert the image data DATA such that a gradation image that is gradually reduced in luminance in a direction away from the first display area AA1 is displayed on a partial region, adjacent to the first display area AA1, of the second display area AA2.

In this case, while the display device is driven in the partial display mode, a deterioration deviation between the first and second pixels P1 and P2 disposed in a boundary area between the valid display area (e.g., the first display area AA1) and the invalid display area (e.g., the second display area AA2) may be reduced or mitigated. Consequently, an image sticking phenomenon on the display area DA may be reduced or prevented from being occurred when the display device is driven in the entire display mode. Thereby, the image quality of the display device may be improved.

To achieve the above-mentioned purpose, the timing controller 113 may include an image converter 114. In the exemplary embodiments of FIGS. 8 and 9, the image converter 114 is illustrated as being provided in the timing controller 113, but the present invention is not limited thereto. For example, in an exemplary embodiment, the image converter 114 may be provided in the data driver 112. In another exemplary embodiment, the image converter 114 may be provided outside the display driver 110. For instance, the image inverter 114 may be provided in the processor 120 or between the processor 120 and the display driver 110.

The image converter 114 may receive the image data DATA from the processor 120 in the partial display mode. The image converter 114 may convert the image data DATA and output converted image data DATA' such that a gradation image is displayed on at least a region of the invalid display area, particularly, on at least a region, adjacent to the valid display area, of the invalid display area. In an exemplary embodiment, the converted image data DATA' may include gradation data corresponding to at least the region, adjacent to the valid display area, of the invalid display area. For example, the converted image data DATA' may include gradation data corresponding to a plurality of horizontal and vertical pixel rows that are adjacent to the valid display area among the pixel rows disposed in the invalid display area. In an exemplary embodiment, the gradation data may include a gradation value set to be gradually reduced in luminance in a direction away from the valid display area.

The processor 120 may generate the control signal CS and the image data DATA for driving the display driver 110 and/or the display panel 100. In an exemplary embodiment, the processor 120 may be an application processor of a mobile device. Here, the kind of processor 120 is not limited thereto. In another exemplary embodiment, the processor 120 may be a different kind of processor corresponding to the associated display device.

In an exemplary embodiment, the processor 120 may select any one mode of the entire display mode and the partial display mode, and control the display driver 110 and/or the display panel 100 according to the selected mode.

In an exemplary embodiment, for example, the processor 120 may receive a sensing signal SES from the sensor 130 and select any one display mode of the entire display mode and the partial display mode. For the ease of explanation, in the descriptions of exemplary embodiments of the present invention, the display mode is divided into two modes, but the present invention is not limited thereto. For instance, the partial display mode may be subdivided into a plurality of partial display modes in which valid images are partially displayed on respective regions at different positions and/or respective regions having different display ranges. In this case, the display mode may be divided into at least three modes.

In an exemplary embodiment, the sensing signal SES may include information about whether the display panel DA has been deformed, the degree of deformation, and/or a deformed region. In this case, the processor 120 may select any one display mode and/or a valid display area in response to the sensing signal SES and operate according to the selected display mode. In an exemplary embodiment, for example, the processor 120 may generate a selection signal corresponding to the selected display mode and generate the image data DATA corresponding to an image suitable for the selected valid display area. In an exemplary embodiment, the selection signal may be included in the control signal CS and supplied to the display driver 110. Then, the display driver 110 may be operated in the entire display mode or the partial display mode in response to the selection signal. In an exemplary embodiment, for example, the selection signal may be supplied to the timing controller 113 so as to control the operation of the image converter 114. Furthermore, the image data DATA corresponding to the valid display area may also be supplied to the timing controller 113.

The sensor 130 may include a sensing element configured to sense the use environment and/or state of the display device. In an exemplary embodiment, for example, the sensor 130 may include a sensing element that is provided in or around the display panel 100 so as to sense deformation of the display panel 100 and output a sensing signal SES corresponding to the deformation. The kind of sensor 130 is not limited to the above exemplary embodiment. In other words, the sensor 130 may be embodied by any one of various well-known sensing elements.

As described above, while the display device according to an exemplary embodiment of the invention is driven in the partial display mode, a gradation image which is gradually reduced in luminance in a direction away from a valid display area may be displayed on at least a region, adjacent to the valid display area, of an invalid display area. That is, in an exemplary embodiment of the invention, a rapid luminance change may be effectively prevented from being generated in a boundary area between the valid display area and the invalid display area. Therefore, a deterioration deviation between first and second pixels P1 and P2 disposed in a boundary area between two adjacent display areas, e.g., the first and second display areas AA1 and AA2, may be reduced or mitigated. Consequently, even when the display device that has been driven in the partial display mode for a long period of time is converted from the partial display mode into the entire display mode, the image sticking phenomenon may be reduced or effectively prevented from being occurred on the display area DA, and the image quality of the display device may be improved.

Figure 10:
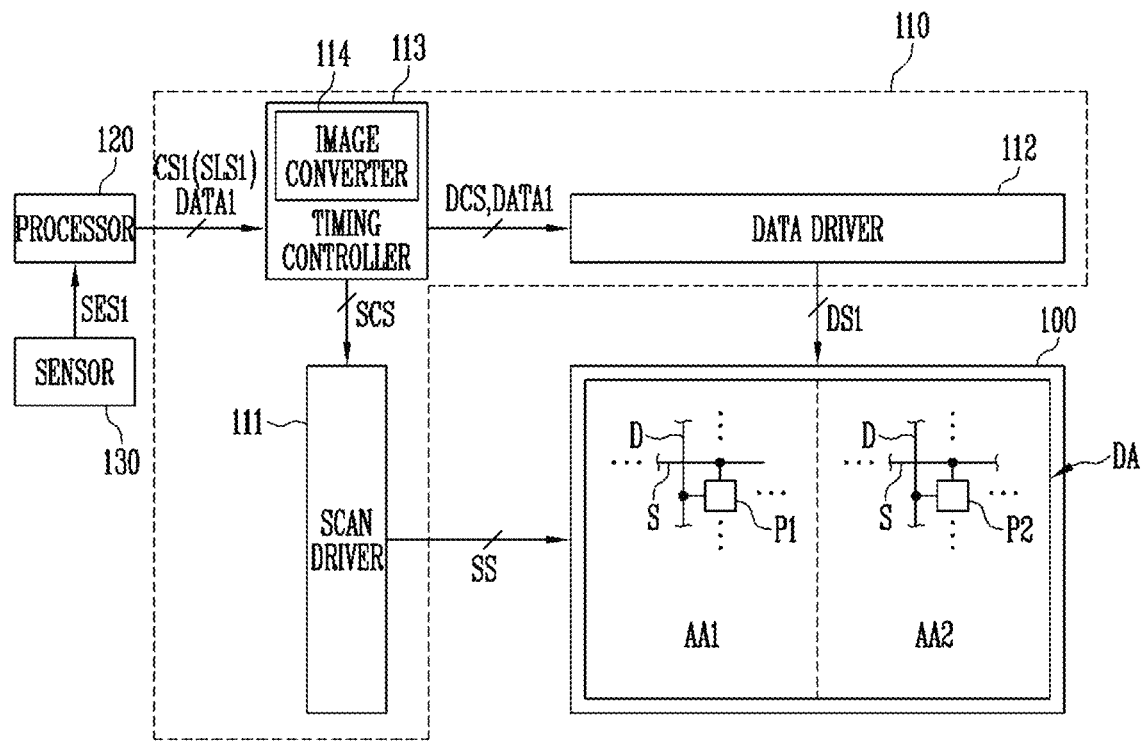
FIG. 10 is a block diagram illustrating an exemplary embodiment of a display device to explain a method of driving a display device in a first mode in accordance with the invention.
Figure 11:
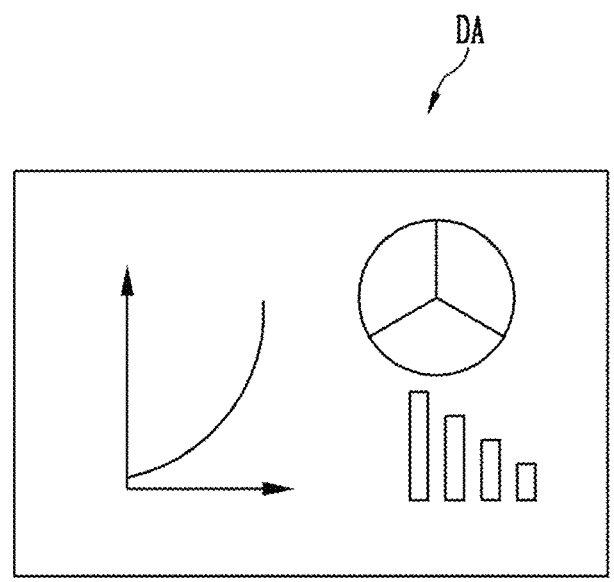
FIG. 11 illustrates an exemplary embodiment of a display area displaying an image when the display device is driven in the first mode in accordance with the invention.

FIG. 10 is a block diagram illustrating an exemplary embodiment of a display device to explain a method of driving a display device in a first mode in accordance with the invention. FIG. 11 illustrates an exemplary embodiment of the display area DA displaying an image when the display device is driven in the first mode in accordance with the invention. In FIGS. 10 and 11, like reference numerals are used to designate the same or similar components as those of the exemplary embodiments of FIGS. 8 and 9, and detailed descriptions thereof will be omitted.

Referring to FIGS. 10 and 11, the display device may be driven in the first mode depending on predetermined use environment, state, and/or conditions. In an exemplary embodiment, the first mode may be the entire display mode described above.

In an exemplary embodiment of, for example, the display device may be driven in the first mode when a first sensing signal SES1 is supplied from the sensor 130. In an exemplary embodiment, the first sensing signal SES1 may be a sensing signal indicating the unfolded state of the display panel 100. In an exemplary embodiment, the sensor 130 may output a sensing signal only when the display panel 100 is deformed, and may not output a sensing signal in other cases. In other words, in an exemplary embodiment, the operation of generating the first sensing signal SES1 may be omitted when the display panel 100 is not deformed.

When the first sensing signal SES1 is inputted from the sensor 130 or a predetermined sensing signal is not inputted, the processor 120 may be operated in the first mode. In detail, the processor 120 may set the entirety of the display area DA including the first and second display areas AA1 and AA2 to a valid display area according to the first mode, and generate first image data DATA1 corresponding to an image to be displayed on the entirety of the display area DA. In an exemplary embodiment, for example, the processor 120 may generate the first image data DATA1 corresponding to the first and second display areas AA1 and AA2 according to the first mode.

Furthermore, the processor 120 may generate a first control signal CS1 corresponding to the first mode, and output the first control signal CS1 to the display driver 110. In an exemplary embodiment, a first selection signal SLS1 including information about the selected display mode, i.e., the first mode, may be included in the first control signal CS1. In an exemplary embodiment, when the display device is driven in the first mode, the operation of generating the first selection signal SLS1 may be omitted. In this case, the display driver 110 may be set such that it is operated in the first mode if a predetermined selection signal is not supplied from the processor 120.

When the first selection signal SLS1 is supplied from the sensor 130 or a predetermined sensing signal is not inputted, the display driver 110 may be operated in the first mode. In detail, the display driver 110 may generate first data signals DS1 corresponding to the first image data DATA1 according to the first mode, and supply the first data signals DS1 to the first and second pixels P1 and P2 through the data lines D.

In an exemplary embodiment, for example, the timing controller 113 may generate the scan control signal SCS and the data control signal DCS using the first control signal CS1, and supply the scan control signal SCS and the data control signal DCS to the scan driver 111 and the data driver 112, respectively. Furthermore, the timing controller 113 may rearrange the first image data DATA1 and supply it to the data driver 112. Then, the scan driver 111 may generate scan signals SS in response to the scan control signal SCS, and sequentially supply the scan signals SS to scan lines S of horizontal pixel rows disposed on the display panel 100. The data driver 112 may generate first data signals DS1 in response to the data control signal DCS and the first image data DATA1 or the rearranged first image data, and supply the first data signals DS1 to the data lines D.

First data signals DS1 may be inputted from the data driver 112 to each horizontal pixel row that is supplied with a scan signal SS during a corresponding horizontal period. In other words, the first data signals DS1 may include data signals corresponding to a plurality of horizontal lines of the number of horizontal pixel rows disposed on the display panel 100. Data signals corresponding to each horizontal line may be supplied to the first and second pixels P1 and P2 of a corresponding horizontal pixel row during an associated horizontal period. Consequently, as shown in the exemplary embodiment of FIG. 11, a predetermined valid image corresponding to the first image data DATA1 may be displayed on the entirety of the display area DA.

Figure 12:
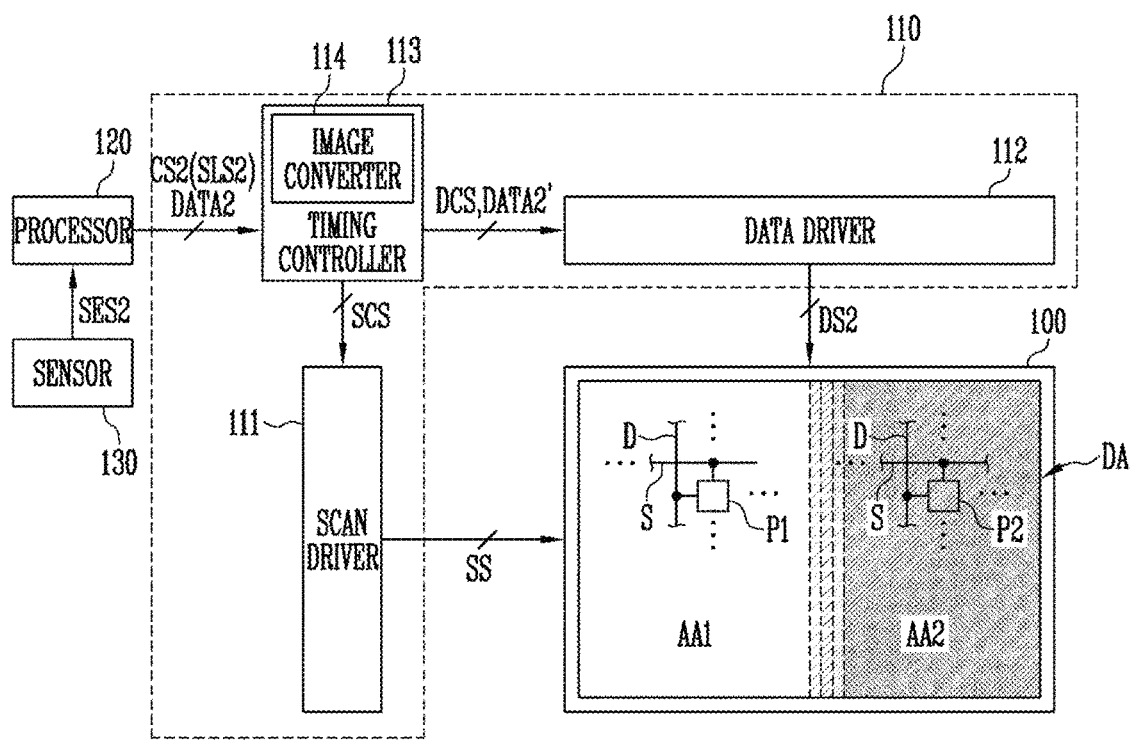
FIG. 12 is a block diagram illustrating an exemplary embodiment of a display device to explain a method of driving the display device in a second mode in accordance with the invention.
Figure 13A:
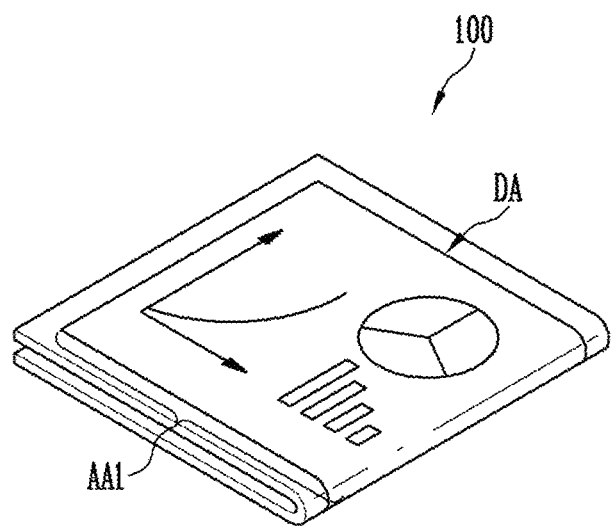
FIGS. 13A and 13B illustrate an exemplary embodiment of a display device displaying an image on the display area when the display device is driven in the second mode in accordance with the invention.
Figure 13B:
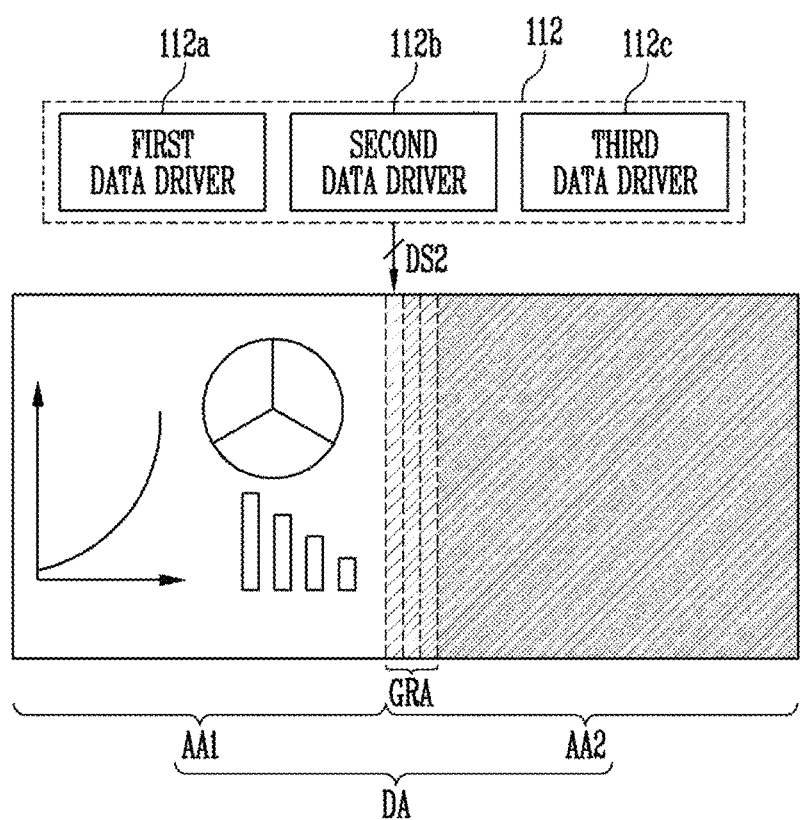

FIG. 12 is a block diagram illustrating an exemplary embodiment of a display device to explain a method of driving the display device in the second mode in accordance with the invention. FIGS. 13A and 13B illustrate an exemplary embodiment of a display device displaying an image on the display area DA when the display device is driven in the second mode in accordance with the invention. FIG. 13A illustrates an example of the use conditions (or the state) of the display device when it is driven in the second mode. FIG. 13B is a development view of the display area of FIG. 13A to illustrate an image displayed on the invalid display area and/or on/off states of the invalid display area. FIG. 13B also illustrates the data driver so as to show an exemplary embodiment of the configuration of the data driver. In addition, FIGS. 14A and 14B respectively illustrate exemplary embodiments of methods of converting image data in accordance with the invention.

Referring to FIGS. 12 to 13B, the display device may be driven in the second mode depending on predetermined use environment, state, and/or conditions. In an exemplary embodiment, the second mode may be the partial display mode described above.

In an exemplary embodiment, for example, the display device may be driven in the second mode when a second sensing signal SES2 is supplied from the sensor 130. In an exemplary embodiment, the second sensing signal SES2 may be a sensing signal indicating the deformed state of the display panel 100. For instance, the sensor 130 may output the second sensing signal SES2 when the display panel 100 is folded outward at a predetermined angle or more.

When the second sensing signal SES2 is inputted from the sensor 130, the processor 120 may be operated in the second mode. In detail, according to the second mode, the processor 120 may set a region of the display area DA to the valid display area, and set the other region of the display area DA to the invalid display area. Hereinafter, it will be assumed that the first display area AA1 is set to the valid display area, and the second display area AA2 is set to the invalid display area. In this case, while the display device is driven in the second mode, the processor 120 may match an image to be displayed with the first display area AA1, and generate second image data DATA2 corresponding to the first display area AA1.

Furthermore, the processor 120 may generate a second control signal CS2 corresponding to the second mode, and output the second control signal CS2 to the display driver 110. In an exemplary embodiment, a second selection signal SLS2 including information about the selected display mode, i.e., the second mode, may be included in the second control signal CS2.

The display driver 110 may operate in the second mode in response to the second selection signal SLS2. In detail, the display driver 110 may convert the second image data DATA2 to the converted second image data DATA2' according to the second mode, and generate a second data signal DS2 corresponding to the converted second image data DATA2'. For this operation, the display driver 110 may include the image converter 114.

The image converter 114 may receive the second image data DATA2 from the processor 120 in the second mode and convert the second image data DATA2 such that a gradation image is displayed on at least a region of the second display area AA2.

In an exemplary embodiment, the gradation image may be displayed on at least a region, adjacent to the first display area AA1, of the second display area AA2, and may be an image that is gradually reduced in luminance in a direction away from the first display area AA1. For example, the gradation image on the second display area AA2 may be an image formed by gradually changing the luminance of at least one pixel column, adjacent to the second display area AA2, among pixels columns provided on the first display area AA1 in a direction away from the first display area AA1, for example, by gradually changing the luminance of the last vertical pixel column, adjacent to the second display area AA2, of the first display area AA1. In this case, the image converter 114 may generate, in the second mode, gradation data corresponding to at least a region of the second display area AA2 using a gradation value of the last vertical pixel column of the first display area AA1.

Figure 14A:
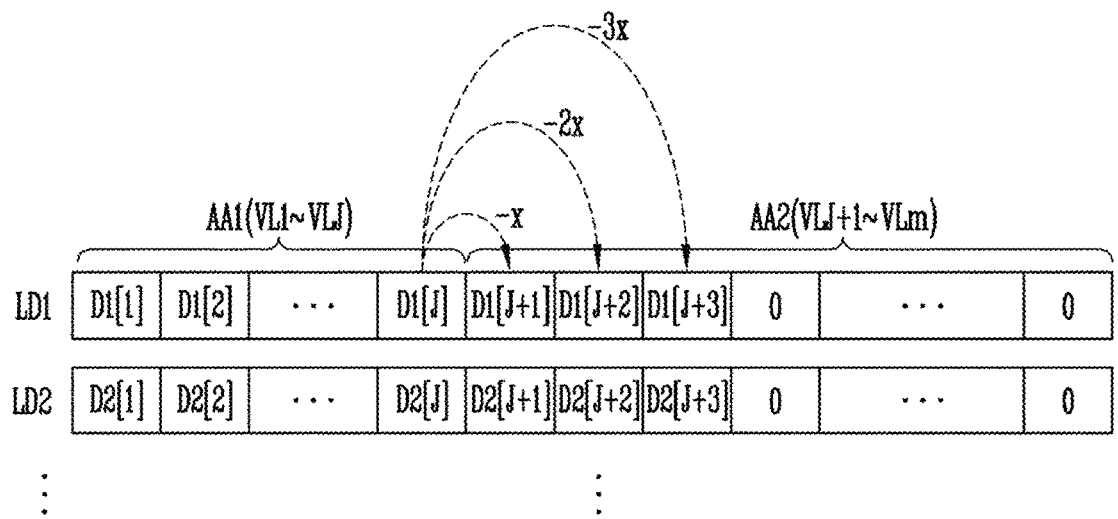
FIGS. 14A and 14B respectively illustrate exemplary embodiments of methods of converting image data in accordance with the invention.

In an exemplary embodiment, for example, as shown in FIG. 14A, the image converter 114 may generate gradation data using the gradation value of the last vertical pixel column, adjacent to the second display area AA2, of the first display area AA1. For instance, if the first display area AA1 includes first to J-th (J is a natural number of 2 or more) vertical pixel columns VL1 to VLJ, the image converter 114 may generate gradation data D1[J+1], D1[J+2], D1[J+3], D2[J+1], D2[J+2], D2[J+3], . . . by subtracting gradation values that increase successively in the direction away from the first display area AA1 (e.g., a gradation value between the minimum gradation value, e.g., "0" and the maximum gradation value, e.g., "255") from J-th gradation values D1[J], D2[J], . . . included in respective line data LD1, LD2, . . . of the horizontal lines. In an exemplary embodiment, for example, with regard to the line data LD1 corresponding to the first horizontal line, the image converter 114 may change gradation values of a plurality of vertical pixel columns including a J+1-th vertical pixel column VLJ+1, e.g., gradation values D1[J+1], D1[J+2], and D1[J+3] of J+1-th to J+3-th vertical pixel columns VLJ+1 to VLJ+3, into gradation values formed by respectively subtracting x, 2x, and 3x from the J-th gradation value D1[J]. When the calculated rate value has a minus value, it is considered that the rate value is "0."

Alternatively, the image converter 114 may generate the gradation data D1[J+1], D1[J+2], D1[J+3], D2[J+1], D2[J+2], D2[J+3], . . . for each vertical pixel column by successively subtracting a predetermined value from the gradation value of the preceding vertical pixel column. In an exemplary embodiment, for example, the J+1-th gradation value D1[J+1] included in the line data LD1 corresponding to the first horizontal line may be a value obtained by subtracting a predetermined value x from the J-th gradation value D1[J]. The J+2-th gradation value D1[J+2] may be a value obtained by subtracting the value x from the J+1-th gradation value D1[J+1].

In other words, the image converter 114 may use, e.g., the gradation values D1[J], D2[J], D1[J+3], . . . of the J-th vertical pixel column VLJ to generate the gradation data D1[J+1], D1[J+2], D1[J+3], D2[J+1], D2[J+2], D2[J+3], . . . . For this, the image converter 114 may include a memory configured to store, hold, or delay the gradation values D1[J], D2[J], . . . of the J-th vertical pixel column VLJ. In an exemplary embodiment, for example, the image converter 114 may temporarily store the gradation values D1[J], D2[J], . . . of the J-th vertical pixel column VLJ using a flip-flop ("FF").

In the invention, the number of vertical pixel columns VL that are targets to be changed in gradation value by the image converter 114, and the size or width of a gradation area GRA on which a gradation image is displayed corresponding to the vertical pixel columns VL are not particularly limited. In an exemplary embodiment, for example, until gradation data D1[J+n], D2[J+n], . . . of the J+n-th vertical pixel column VLJ+n in the gradation area GRA have a gradation value (e.g., "0" or "1") of a predetermined minimum gradation or less, the image converter 114 may generate the gradation data of the gradation area GRA.

In an exemplary embodiment, with regard to a region of the second display area AA2 other than the gradation area GRA, the gradation value inputted from the processor 120 may be maintained as it is. For example, the gradation value corresponding to the region of the second display area AA2 other than the gradation area GRA may be maintained to a value (e.g., "0") corresponding to the minimum gradation (e.g., a black gradation).

Figure 14B:
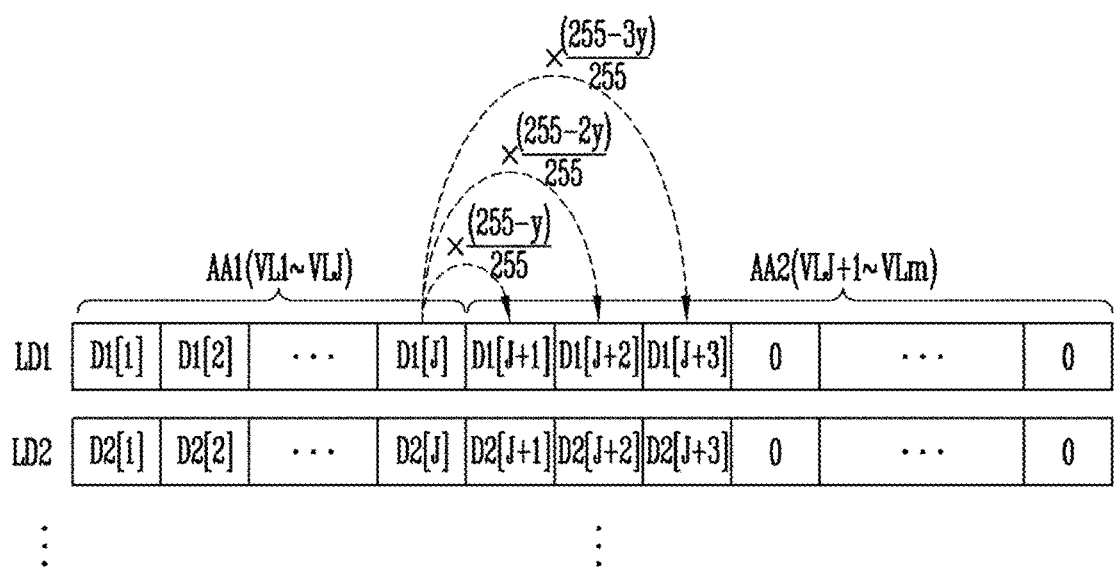

Furthermore, the method of generating the gradation data D1[J+1], D1[J+2], D1[J+3], D2[J+1], D2[J+2], D2[J+3], . . . by the image converter 114 may be changed in various ways without being limited to that of the foregoing exemplary embodiments. In an exemplary embodiment, for example, as shown in FIG. 14B, the image converter 114 may generate gradation data D1[J+1], D1[J+2], D1[J+3], D2[J+1], D2[J+2], D2[J+3], . . . by applying rate values that are successively reduced in the direction away from the first display area AA1 to gradation values D1[J], D2[J], . . . of the last J-th vertical pixel column VLJ of the first display area AA1. For example, with regard to the line data LD1 corresponding to the first horizontal line, the image converter 114 may generate gradation values of J+1-th to J+3-th vertical pixel columns VLJ+1 to VLJ+3 by multiplying the J-th gradation value D1[J] by (255−y)/255, (255−2y)/255, and (255−3y)/255, respectively, thereby generating gradation data D1[J+1], D1[J+2], D1[J+3] corresponding to the first horizontal pixel row. Here, y may be a gradation value between the minimum gradation value (e.g., "0") and the maximum gradation value (e.g., "255") and when the calculated rate value has a minus value, it is considered that the rate value is "0".

As an alternative exemplary embodiment, the image converter 114 may generate the gradation data D1[J+1], D1[J+2], D1[J+3], D2[J+1], D2[J+2], D2[J+3], . . . for each vertical pixel column by successively multiplying the gradation values of the preceding vertical pixel column with a predetermined rate value, e.g., (255−y)/255. For example, the J+1-th gradation value D1[J+1] included in the line data LD1 corresponding to the first horizontal line may be a value obtained by multiplying the J-th gradation value D1[J] with a predetermined rate value (e.g., (255−y)/255). The J+2-th gradation value D1[J+2] may be a value obtained by multiplying the J+1-th gradation value D1[J+1] with the rate value (e.g., (255−y)/255). In this case, until gradation data D1[J+n], D2[J+n], . . . of the J+n-th vertical pixel column VLJ+n in the gradation area GRA have a gradation value (e.g., "0" or "1") of a predetermined minimum gradation or less, the image converter 114 may generate the gradation data of the gradation area GRA.

In an exemplary embodiment, the size, the range, or the like of the gradation area GRA may be preset, and the subtraction value or the rate value may be set or changed taking into account the gradation values D1[J1], D2[J], . . . of the last vertical pixel column VLJ of the first display area AA1 and the size of the gradation area GRA. For example, the maximum proportion (e.g., 2% or less) of the gradation area GRA to the entire display area DA or the range of the gradation area GRA may be preset, and the subtraction value or the rate value may be set to generate the gradation data D1[J+1], D1[J+2], D1[J+3], D2[J+1], D2[J+2], D2[J+3], . . . in correspondence with the maximum proportion or the range of the gradation area GRA.

The second image data DATA2' converted by the image converter 114 may be supplied to the data driver 112. Then, the data driver 112 may generate a second data signal DS2 in response to the converted second image data DATA2' and the data control signal DCS, and output the second data signal DS2 to the display panel 100. In an exemplary embodiment, the data driver 112 may include a plurality of sub-data drivers, e.g. first to third data drivers 112a, 112b, and 112c. For example, the data driver 112 may include a plurality of chips or blocks corresponding to the landscape type display panel 110.

The display panel 100 supplied with the second data signal DS2 from the data driver 112 may display an image corresponding to the second data signal DS2. In an exemplary embodiment, for example, when the display device is driven in the second mode, the display panel 100 may display a valid image on the first display area AA1, and display a gradation image on a region (e.g., the gradation area GRA), adjacent to the first display area AA1, of the second display area AA2. The pixels (e.g., the second pixels P2 disposed on the J+4-th to M-th vertical pixel columns VLJ+4 to VLM) of the other region of the second display area AA2 may be turned off such that they do not emit light. Accordingly, the other region of the second display area AA2 other than the gradation area GRA may be maintained in the off state.

In the foregoing exemplary embodiments, there have been illustrated the examples in which the gradation data D1[J+1], D1[J+2], D1[J+3], D2[J+1], D2[J+2], D2[J+3], . . . is generated by a comparatively simple logic including an operation of applying subtraction values that are successively increased or rate values that are successively reduced to the gradation values of a pixel column, e.g., the J-th vertical pixel column VLJ, included in the first display area AA1. Consequently, an increase in the size of the display driver 110 (e.g., a TED D-IC) to provide the above logic may be minimized, and a rapid luminance change may be mitigated or effectively prevented from being occurred on the boundary area between the first display area AA1 and the second display area AA2. Thereby, a deterioration deviation between adjacent first and second pixels P1 and P2 may be reduced.

In the foregoing exemplary embodiments, there have been illustrated the examples in which the gradation values of the last one vertical pixel column, i.e., the J-th vertical pixel column VLJ, of the vertical pixel columns VL1 to VLJ included in the first display area AA1 is used to generate the gradation data D1[J+1], D1[J+2], D1[J+3], D2[J+1], D2[J+2], D2[J+3], . . . , but the invention is not limited thereto. For example, in another exemplary embodiment of the invention, gradation values of two or more vertical pixel columns, e.g., J−1-th and J-th vertical pixel columns VLJ−1 and VLJ, of the vertical pixel columns VL1 to VLJ included in the first display area AA1 may be used to generate the gradation data D1[J+1], D1[J+2], D1[J+3], D2[J+1], D2[J+2], D2[J+3], . . . . For example, a median value or an average value of the gradation values of the J−1-th and J-th vertical pixel columns VLJ−1 and VLJ may be used to generate the gradation data D1[J+1], D1[J+2], D1[J+3], D2[J+1], D2[J+2], D2[J+3], . . . .

That is, in an exemplary embodiment of the invention, the gradation data D1[J+1], D1[J+2], D1[J+3], D2[J+1], D2[J+2], D2[J+3], . . . may be generated by gradually reducing the gradation values of the last pixel column (e.g., the J-th vertical pixel column VLJ) of the valid display area from the last pixel column VLJ to a plurality of pixel columns, e.g., VLJ+1 to VLJ+3, adjacent to the outermost vertical pixel column and disposed in the invalid display area. Here, the method of generating the gradation data D1[J+1], D1[J+2], D1[J+3], D2[J+1], D2[J+2], D2[J+3], . . . may be changed in various ways without being limited to a particular method. In an exemplary embodiment, a gradation image corresponding to the gradation data D1[J+1], D1[J+2], D1[J+3], D2[J+1], D2[J+2], D2[J+3], . . . may be displayed on the invalid display area (e.g., the second display area AA2) that is covered with the casing 200 or the like, and thus may be invisible to the user. In other words, the gradation image may not affect the image quality of the valid display area.

Figure 15A:
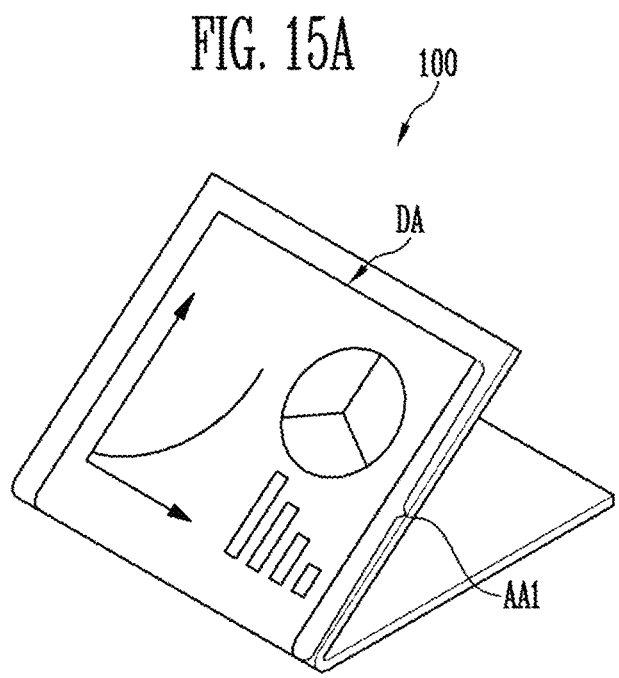
FIGS. 15A and 15B illustrate an exemplary embodiment of a display device displaying an image on the display area when the display device is driven in the second mode in accordance with the invention.
Figure 15B:
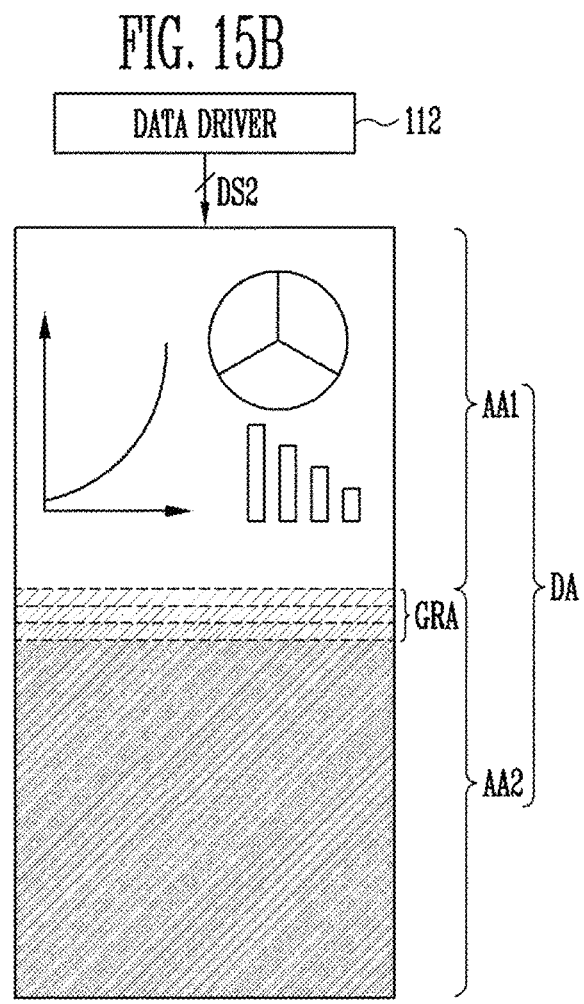
Figure 16A:
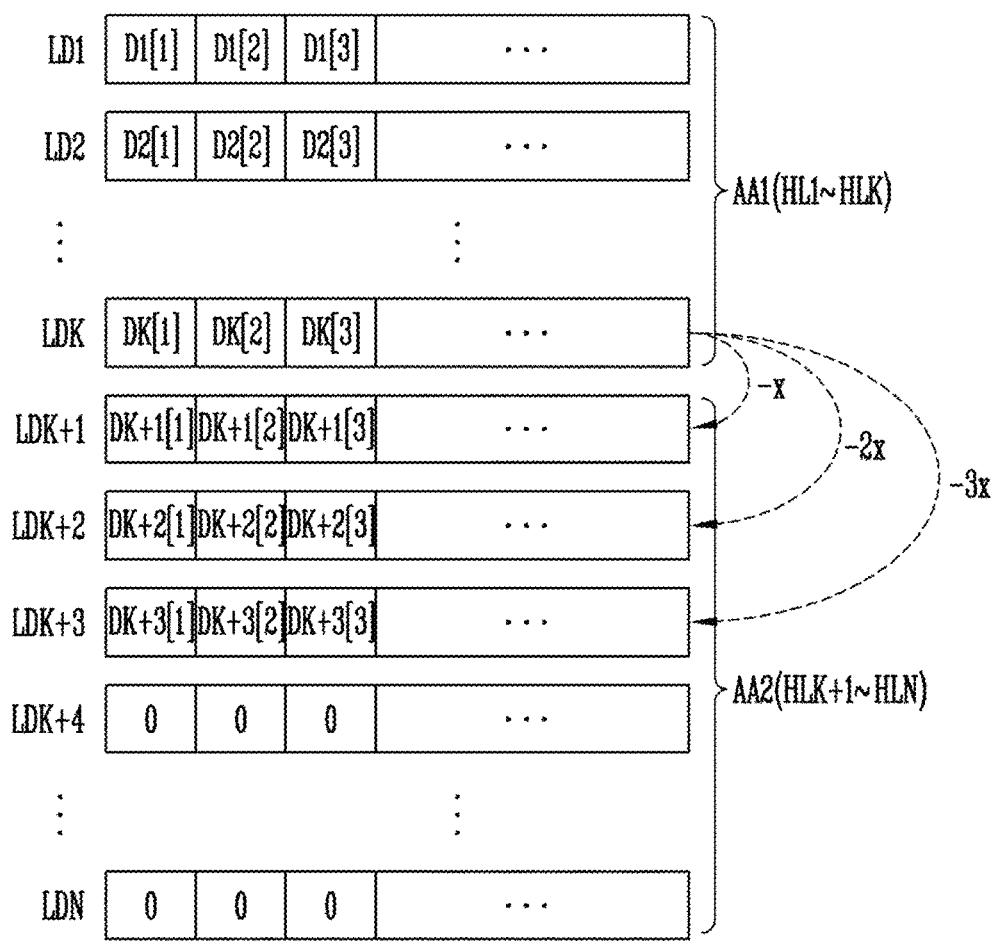
FIGS. 16A and 16B illustrate exemplary embodiments of methods of converting image data in accordance with the invention.
Figure 16B:
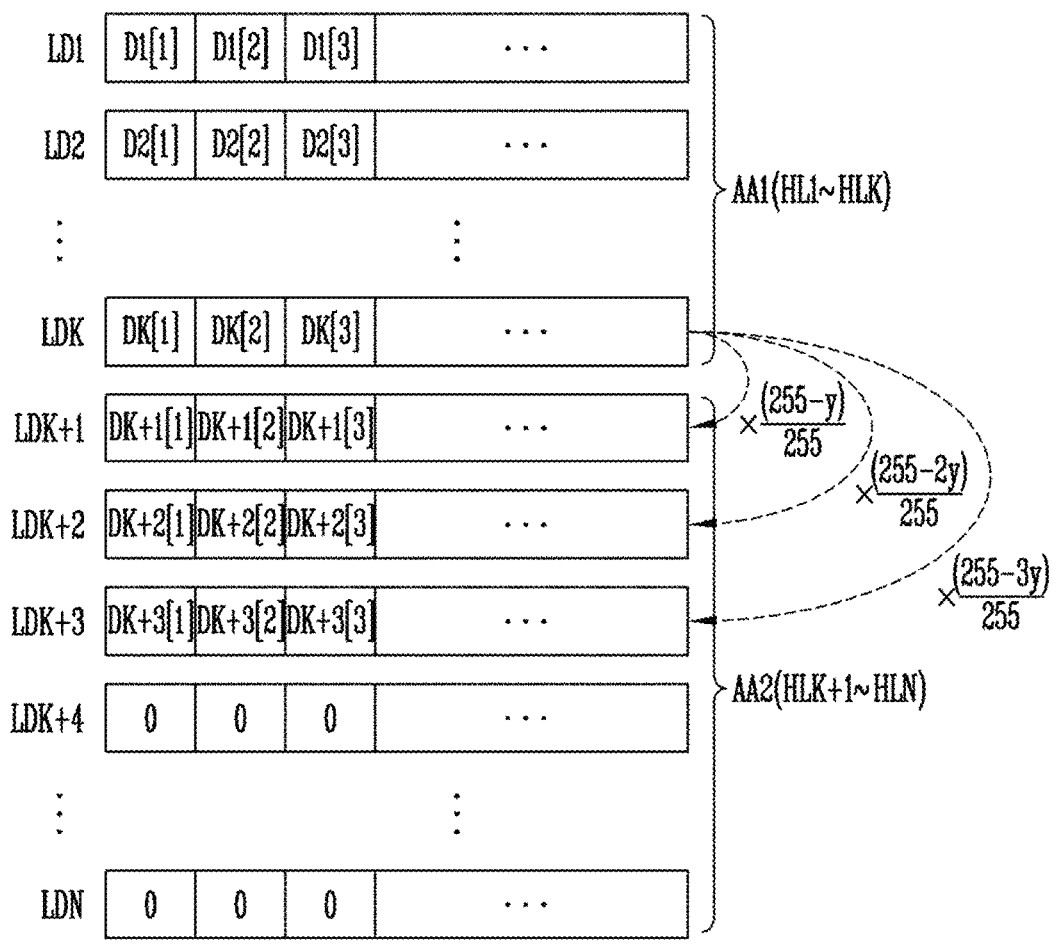

FIGS. 15A and 15B illustrate an exemplary embodiment of a display device displaying an image on the display area DA when the display device is driven in the second mode in accordance the invention. FIG. 15A illustrates an example of the use conditions or the state of the display device when it is driven in the second mode. FIG. 15B is a development view of an exemplary embodiment of the display area of FIG. 15A to illustrate an image displayed on the invalid display area and/or an on/off state of the invalid display area. In addition, the FIG. 15B also illustrates the data driver. FIGS. 16A and 16B respectively illustrate exemplary embodiments of methods of converting image data in accordance with the invention. In the following descriptions of FIGS. 15A to 16B, detailed descriptions equal or similar to those of the exemplary embodiments of FIGS. 13A to 14B will be omitted.

Referring to FIGS. 15A and 15B, in an exemplary embodiment, the display area DA may be disposed in a portrait form when it is driven. Thus, the first and second display areas AA1 and AA2 may be respectively disposed at upper and lower positions. In other words, in the present exemplary embodiment, the first display area AA1 and the second display area AA2 may respectively include first pixels (P1 of FIG. 9) and second pixels (P2 of FIG. 9). The first pixel P1 and the second pixels P2 may be disposed on different horizontal pixel rows.

In an exemplary embodiment, while the display device is driven in the second mode, the first display area AA1 may display a predetermined valid image, and the second display area AA2 may display a gradation image and/or black gradation. For example, at least a region of the second display area AA2 that is adjacent to the first display area AA1 may be a gradation area GRA, and the other region may be an off area that is turned off to display the black gradation. In an exemplary embodiment, while the display device is driven in the second mode, the second pixels P2 of the gradation area GRA may display, in response to a second data signal DS2 supplied from the data driver 112, a gradation image that is gradually reduced in luminance in a direction away from the first display area AA1.

As such, in an exemplary embodiment in which the first and second display areas AA1 and AA2 are disposed at upper and lower positions, respectively, and only the first display area AA1 displays a valid image while the display device is driven in the second mode, gradation values of the last horizontal pixel row of the first display area AA1 may be used to generate the gradation data of the second display area AA2. However, the invention is not limited thereto. In another exemplary embodiment, for example, gradation values of a plurality of horizontal pixel rows disposed on the first display area AA1 may be used to generate gradation data of the second display area AA2.

In an exemplary embodiment, for example, as shown in FIG. 16A, when the first display area AA1 includes first to K-th (K is a natural number) horizontal pixel rows HL1 to HLK and the second display area AA2 includes K+1-th to N-th (N is a natural number greater than K) horizontal pixel rows HLK+1 to HLN, gradation values DK[1], DK[2], DK[3], . . . of K-th line data LDK corresponding to the last K-th horizontal pixel row HLK of the first display area AA1 may be used to generate gradation data DK+1[1], DK+1[2], DK+1[3], . . . , DK+2[1], DK+2[2], DK+2[3], . . . , DK+3[1], DK+3[2], DK+3[3], . . . of a plurality of horizontal lines corresponding to a plurality of horizontal pixel rows (e.g., HLK+1 to HLK+3) including the K+1-th horizontal pixel row HLK+1. In this case, the image converter 114 described above may include a line memory configured to store at least K-th line data LDK.

In an exemplary embodiment, for example, K+1-th to K+3-th line data LDK+1 to LDK+3 may be changed by applying predetermined subtraction values that increase successively to the gradation data DK+1[1], DK+1[2], DK+1[3], . . . of the K-th line data LDK. The changed line data LDK+1 to LDK+3 may be used as the gradation data DK+1[1], DK+1[2], DK+1[3], . . . , DK+2[1], DK+2[2], DK+2[3], . . . , DK+3[1], DK+3[2], DK+3[3], . . . . For example, a value obtained by subtracting the predetermined value x from the first gradation value DK[1] of the K-th line data LDK may be used as the first gradation value DK+1[1] of the K+1-th line data LDK+1. A value obtained by subtracting the predetermined value x from the second gradation value DK[2] of the K-th line data LDK may be used as the second gradation value DK+1[2] of the K+1-th line data LDK+1.

Furthermore, a value obtained by subtracting a predetermined value 2x from the first gradation value DK[1] of the K-th line data LDK may be used as the first gradation value DK+2[1] of the K+2-th line data LDK+2. A value obtained by subtracting the predetermined value 2x from the second gradation value DK[2] of the K-th line data LDK may be used as the second gradation value DK+2[2] of the K+2-th line data LDK+2. In another exemplary embodiment, a value obtained by subtracting a predetermined value x from the first gradation value DK+1[1] of the K+1-th line data LDK+1 may be used as the first gradation value DK+2[1] of the K+2-th line data LDK+2. A value obtained by subtracting the predetermined value x from the second gradation value DK+1[2] of the K+1-th line data LDK+1 may be used as the second gradation value DK+2[2] of the K+2-th line data LDK+2. As such, in the foregoing exemplary embodiment, the gradation data DK+1[1], DK+1[2], DK+1[3], ..., DK+2[1], DK+2[2], DK+2[3], ..., DK+3[1], DK+3[2], DK+3[3], ... may be generated using the K-th line data LDK or each preceding line data.

In an exemplary embodiment, the gradation data DK+1[1], DK+1[2], DK+1[3], ..., DK+2[1], DK+2[2], DK+2[3], ..., DK+3[1], DK+3[2], DK+3[3], ... may be generated using a predetermined rate value. For example, as shown in FIG. 16B, the gradation data DK+1[1], DK+1[2], DK+1[3], DK+2[1], DK+2[2], DK+2[3], DK+3[1], DK+3[2], DK+3[3], ... may be generated by applying, to the K-th line data LDK, rate values (e.g., (255−y)/255, (255−2y)/255, and (255−3y)/255) that are successively reduced in the direction away from the first display area AA1. In an exemplary embodiment, the gradation data DK+1[1], DK+1[2], DK+1[3], ..., DK+2[1], DK+2[2], DK+2[3], ..., DK+3[1], DK+3[2], DK+3[3], ... of a plurality of horizontal lines may be successively generated by applying a predetermined rate value (e.g., (255−y)/255) to each preceding line data. In an exemplary embodiment, the operation of generating the gradation data DK+1[1], DK+1[2], DK+1[3], ..., DK+2[1], DK+2[2], DK+2[3], ..., DK+3[1], DK+3[2], DK+3[3], ... may be performed until the last generated gradation data, e.g., DK+3[1], DK+3[2], DK+3[3], ..., has a gradation value (e.g., "0" or "1") of a predetermined minimum gradation or less.

Figure 17:
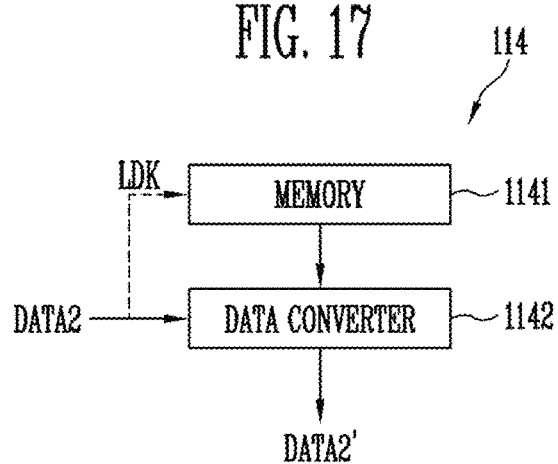
FIG. 17 illustrates an exemplary embodiment of an image converter in accordance with the invention.

FIG. 17 illustrates an exemplary embodiment of an image converter 114 in accordance with the invention.

Referring to FIG. 17, the image converter 114 may include a memory 1141 and a data converter 1142. In an exemplary embodiment, during a period in which the display device is driven in the second mode, the image converter 114 may receive second image data DATA2, and convert the second image data DATA2 to the converted second image data DATA2 before outputting it. For example, the image converter 114 may generate gradation data using K-th line data LDK included in the second image data DATA2.

In an exemplary embodiment, the memory 1141 may be embodied by a line memory corresponding to at least one horizontal line or by a memory element such as a flip-flop. For instance, the memory 1141 may receive K-th line data LDK, or J-th gradation values D1[J], D2[J], ... of line data LD of the respective horizontal lines, and store them.

The data converter 1142 may convert the second image data DATA2 using the data stored in the memory 1141. In an exemplary embodiment, for example, the data converter 1142 may change the K+1-th to K+3-th line data LDK+1 to LDK+3 using the K-th line data LDK in such a way that the gradation values thereof are gradually reduced in the direction away from the first display area AA1. For example, the K+1-th to K+3-th line data LDK+1 to LDK+3 included in the second image data DATA2 may have a gradation value (e.g., "0") corresponding to a black gradation. The K+1-th to K+3-th line data LDK+1 to LDK+3 included in the converted second image data DATA2' may have gradation values that are gradually reduced in the direction away from the first display area AA1. If the gradation data is generated, the data converter 1142 may convert the second image data DATA2 by disposing the gradation data at positions corresponding to the gradation area GRA, and output the converted second image data DATA2'.

Figure 18:
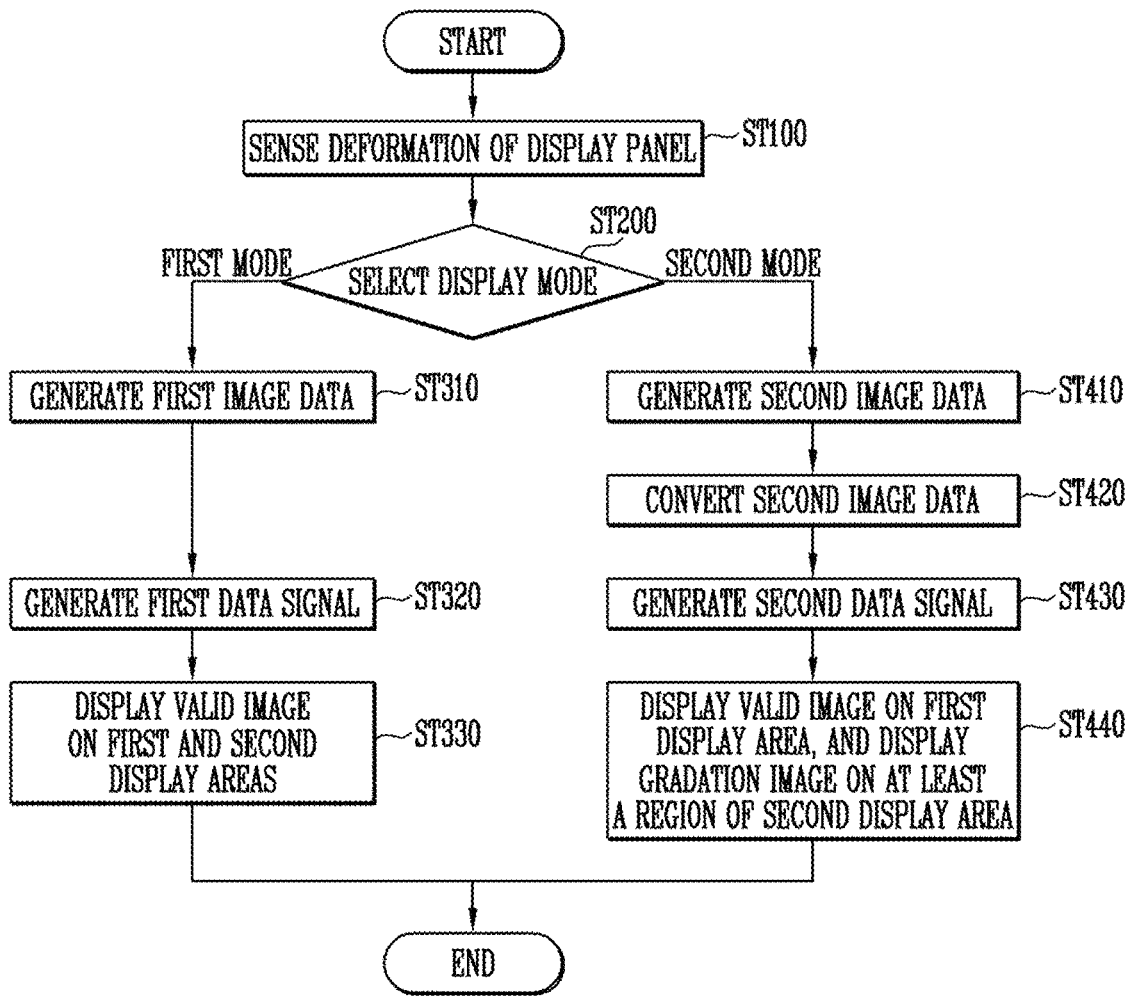
FIG. 18 is a flowchart illustrating an exemplary embodiment of a method of driving a display device in accordance with the invention.

FIG. 18 is a flowchart illustrating an exemplary embodiment of a method of driving a display device in accordance with the invention. Hereinafter, the method of driving the display device in accordance with an exemplary embodiment of the invention will be sequentially described in association with the exemplary embodiments described with reference to the drawings that precede FIG. 18.

<ST100: The Step of Sensing Deformation of a Display Panel>

First, deformation of the display panel 100 including the first and second display areas AA1 and AA2 may be sensed. In an exemplary embodiment, for example, the sensor 130 may sense deformation of the display panel 100 and output a corresponding sensing signal SES1 or SES2 to the processor 120.

<ST200: The Step of Selecting a Display Mode>

The processor 120 that has received the sensing signal SES1 or SES2 may select any one mode of the first mode and the second mode in response to the sensing signal SES1 or SES2. In an exemplary embodiment, for example, when the degree of sensed deformation of the display panel 100 is a predetermined reference value or more, the processor 120 may select the second mode and perform an operation corresponding to the second mode. In the other cases, the processor 120 may select the first mode, and perform an operation corresponding to the first mode.

<ST310: The Step of Generating First Image Data>

When the first mode is selected, the processor 120 may generate first image data DATA1 and supply the first image data DATA1 to the display driver 110. Furthermore, when the first mode is selected, the processor 120 may generate a first control signal CS1 and supply the first control signal CS1 to the display driver 110.

<ST320: The Step of Generating a First Data Signal>

The display driver 110 that has received the first control signal CS1 and the first image data DATA1 from the processor 120 may generate a first data signal DS1 corresponding to the first image data DATA1 and supply the first data signal DS1 to the display panel 100.

<ST330: The Step of Displaying a Valid Image on the First and Second Display Areas>

The display panel 100 that has received the first data signal DS1 may display a valid image on the first and second display areas AA1 and AA2 in response to the first data signal DS1. In other words, when the display device is driven in the first mode, the entirety of the display area DA including the first and second display areas AA1 and AA2 may be used to display the valid image.

<ST410: The Step of Generating Second Image Data>

When the second mode is selected, the processor 120 may generate second image data DATA2 and supply the second image data DATA2 to the display driver 110. In an exemplary embodiment, the processor 120 may generate the second image data DATA2 corresponding to an image suitable for the first display area AA1. Furthermore, when the second mode is selected, the processor 120 may generate a second control signal CS2 and supply the second control signal CS2 to the display driver 110.

<ST420: The Step of Converting Second Image Data>

The display driver 110 that has received the second control signal SC2 and the second image data DATA2 from the processor 120 may convert the second image data DATA2 to the converted second image data DATA2'. In an exemplary embodiment, for example, the image converter 114 provided in the display driver 110 may generate gradation data and convert the second image data DATA2 using the gradation data. In an exemplary embodiment, the image converter 114 may convert the second image data DATA2 such that a gradation image is displayed on at least a region of the second display area AA2. For example, the image converter 114 may use gradation values of the last pixel line, adjacent to the second display area AA2, among the pixel lines provided in the first display area AA1 and generate gradation data corresponding to at least some pixel lines, adjacent to the first display area AA1, of the second display area AA2.

<ST430: The Step of Generating a Second Data Signal>

Subsequently, the display driver 110 may generate a second data signal DS2 corresponding to the converted second image data DATA2' and supply it to the display panel 100. In an exemplary embodiment, for example, the data driver 112 provided in the display driver 110 may generate the second data signal DS2 using the converted second image data DATA2' and supply the second data signal DS2 to the display panel 100.

<ST440: The Step of Displaying a Valid Image on the First Display Area and Displaying a Gradation Image on at Least a Region of the Second Display Area>

The display panel 100 that has received the second data signal DS2 may display a valid image on the first display area AA1 in response to the second data signal DS2, and display a gradation image on at least a region of the second display area AA2. In other words, when the display device is driven in the second mode, only the first display area AA1 may be used to display the valid image, and the gradation image may be displayed on at least a region of the second display area AA2. In an exemplary embodiment, for example, when the display device is driven in the second mode, the valid image may be displayed on the first display area AA1, the gradation image may be displayed on a region, adjacent to the first display area AA1, of the second display area AA2, and second pixels P2 provided on the other region of the second display area AA2 may be turned off.

In various exemplary embodiments of the invention, a display device may be driven selectively in an entire display mode or a partial display mode depending on the use environment, the state, etc. of the display device. Consequently, ease of use of the display device may be enhanced.

Furthermore, in various exemplary embodiments of the invention, even when the display device is driven in the partial display mode, a rapid change in luminance between a valid display area and an invalid display area may be effectively prevented from being occurred. Thereby, deterioration deviation between adjacent pixels may be reduced or mitigated. Therefore, an image sticking phenomenon on the display area may be reduced, and the image quality of the display device may be improved.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular exemplary embodiment may be used singly or in combination with features, characteristics, and/or elements described in connection with other exemplary embodiments unless otherwise specifically indicated. Accordingly, it will be understood by those of skill in the art that various changes in form and details may be made without departing from the spirit and scope of the invention as set forth in the following claims.

What is claimed is:

1. A display device comprising:
a display panel which includes first and second display areas adjacent to each other;
a processor which generates first image data corresponding to the first and second display areas if a display mode is a first mode, and generates second image data corresponding to the first display area if the display mode is a second mode; and
a display driver which generates a first data signal corresponding to the first image data in the first mode, and converts the second image data and generates a second data signal corresponding to the converted second image data in the second mode,
wherein the display driver generates the second data signal corresponding to a gradation area of the second display area based on a first gradation value of the second image data corresponding to at least one pixel line, adjacent to the second display area, among pixel lines provided in the first display area, and generates the second data signal corresponding to a remaining area of the second display area by maintaining a second gradation value of the second image data corresponding to the remaining area, and
wherein, only when the display device is driven in the second mode, a gradation image is displayed on the gradation area based on the second data signal.

2. The display device according to claim 1,
wherein the gradation region is adjacent to the first display area, and
wherein a luminance of the gradation image is gradually reduced in a direction away from the first display area.

3. The display device according to claim 2, wherein the gradation image is an image formed by gradually changing a luminance of the at least one pixel line, adjacent to the second display area, among pixel lines provided in the first display area.

4. The display device according to claim 1,
wherein the display driver comprises an image converter which receives the second image data from the processor in the second mode, and
wherein the image converter converts the second image data such that the gradation image is displayed in the second mode.

5. The display device according to claim 4, wherein the image converter generates, in the second mode, gradation data corresponding to the gradation area of the second display area using the first gradation value of the at least one pixel line, adjacent to the second display area, among the pixel lines in the first display area.

6. The display device according to claim 5, wherein the image converter generates the gradation data by subtracting values that increases successively in a direction away from the first display area from the first gradation value of the at least one pixel line of the first display area.

7. The display device according to claim 5, wherein the image converter generates the gradation data by applying rate values that are successively reduced in a direction away from the first display area to the first gradation value of the last pixel line of the first display area.

8. The display device according to claim 5, wherein the image converter generates the gradation data until the gradation data has a gradation value of a predetermined minimum gradation or less.

9. The display device according to claim 4, wherein the display driver comprises:

a timing controller which comprises the image converter and generates a data control signal and a scan control signal in response to a control signal provided from the processor;

a data driver which generates the first or second data signal in response to the first image data or the converted second image data and the data control signal; and a scan driver which generates a scan signal in response to the scan control signal.

10. The display device according to claim 1, wherein the first and second display areas are successively disposed.

11. The display device according to claim 1, wherein the display panel is a foldable display panel foldable on a predetermined folding axis.

12. The display device according to claim 11, wherein the display panel is folded outward on the folding axis.

13. The display device according to claim 1, further comprising:

a sensor which senses deformation of the display panel and outputs a sensing signal.

14. The display device according to claim 13, wherein the processor is driven in the first or second mode in response to the sensing signal and outputs a selection signal corresponding to the first or second mode.

15. The display device according to claim 14, wherein the display driver operates in the first or second mode in response to the selection signal.

16. A method of driving a display device, comprising:

selecting one of first and second modes;

generating first image data in the first mode and second image data in the second mode;

generating a first data signal corresponding to the first image data in the first mode;

converting the second image data in the second mode;

generating a second data signal corresponding to the converted second image data in the second mode; and displaying a valid image on first and second display areas in response to the first data signal, or displaying the valid image only on the first display area in response to the second data signal, wherein generating the second data signal comprises:

generating the second data signal corresponding to a gradation area of the second display area based on a first gradation value of the second image data corresponding to at least one pixel line, adjacent to the second display area, among pixel lines provided in the first display area; and generating the second data signal corresponding to a remaining area of the second display area by maintaining a second gradation value of the second image data corresponding to the remaining area, and wherein, based on the second data signal, a gradation image is displayed on the gradation area only when the display device is driven in the second mode.

17. The method according to claim 16, further comprising:

sensing deformation of a display panel including the first and second display areas, and outputting a sensing signal, wherein one of the first and second modes is selected in response to the sensing signal.

18. The method according to claim 17, wherein the second mode is selected when the deformation of the display panel is sensed.

19. The method according to claim 16, wherein, when the display device is driven in the second mode, the valid image is displayed on the first display area, the gradation image is displayed on the gradation area of the second display area, and pixels of the remaining area of the second display area are turned off.

* * * * *